(12) United States Patent
Hattori

(10) Patent No.: US 9,853,501 B2
(45) Date of Patent: Dec. 26, 2017

(54) ELECTROMAGNETIC WAVE TRANSMISSION SHEET AND ELECTROMAGNETIC WAVE TRANSMISSION DEVICE

(71) Applicant: Wataru Hattori, Tokyo (JP)

(72) Inventor: Wataru Hattori, Tokyo (JP)

(73) Assignee: NEC CORPORATION, Tokyo (JP)

(*) Notice: Subject to any disclaimer, the term of this patent is extended or adjusted under 35 U.S.C. 154(b) by 819 days.

(21) Appl. No.: 14/375,655

(22) PCT Filed: Dec. 20, 2012

(86) PCT No.: PCT/JP2012/008161
§ 371 (c)(1),
(2) Date: Jul. 30, 2014

(87) PCT Pub. No.: WO2013/114507
PCT Pub. Date: Aug. 8, 2013

(65) Prior Publication Data
US 2015/0022021 A1    Jan. 22, 2015

(30) Foreign Application Priority Data
Feb. 3, 2012    (JP) .................... 2012-022506

(51) Int. Cl.
*H02J 17/00*    (2006.01)
*H04B 13/00*    (2006.01)

(52) U.S. Cl.
CPC ............ *H02J 17/00* (2013.01); *H04B 13/00* (2013.01)

(58) Field of Classification Search
CPC . H02J 17/00; H04B 13/00; H01P 3/12; H05K 9/0073; H05K 9/0088; H01F 27/362
(Continued)

(56) References Cited

U.S. PATENT DOCUMENTS 6,573,810 B2 *    6/2003    Cayrou .................... H01P 5/16
                                                        333/101
6,829,279 B1 *    12/2004    Ohmi .................. G03F 7/70025
                                                        372/50.1
(Continued)

FOREIGN PATENT DOCUMENTS

JP    2007-281678 A    10/2007
JP    2009-296550 A    12/2009
(Continued)

OTHER PUBLICATIONS

H. Fukuda et al., "Reducing radiated emissions from ends of a Two-Dimensional Signal Transmission Sheet", 2010 Nen the Institute of Electronics, Information and Communication Engineers Sogo Taikai Koen Ronbunshu, Mar. 2, 2010, p. 140.
(Continued)

*Primary Examiner* — Daniel Kessie
(74) *Attorney, Agent, or Firm* — Sughrue Mion, PLLC

(57) ABSTRACT

An edge portion which defines a planar shape has two long end sides (108a, 108b) which extend in parallel to each other, and two short end sides (107, 109) which have parallel portions extending in parallel to each other. The two long end sides and the two short end sides are reflection terminals. The parallel portion of the first short end side (107) includes a first portion (107a) and a second portion (107b). The positions of the antinodes of a first standing wave formed by a traveling wave directed toward the first portion (107a) and a reflected wave of the traveling wave and a second standing wave formed by a traveling wave directed toward the second portion (107b) and a reflected wave of the traveling wave in a direction substantially parallel to the long end sides (108a, 108b) are deviated by ¼ of the wavelength of an electromagnetic wave propagating through an electromagnetic wave transmission sheet.

5 Claims, 12 Drawing Sheets

(58) Field of Classification Search
USPC ...... 307/104; 174/394, 396, 388; 428/43, 44
See application file for complete search history.

(56) References Cited

U.S. PATENT DOCUMENTS

| | | | | |
|---|---|---|---|---|
| 7,855,529 B2* | 12/2010 | Liu | ....................... | G06F 1/1632 320/108 |
| 2004/0195767 A1* | 10/2004 | Randall | ............... | A63F 3/00643 273/237 |
| 2007/0029965 A1* | 2/2007 | Hui | ...................... | H01F 38/14 320/112 |
| 2009/0098750 A1* | 4/2009 | Randall | ................ | G06F 1/1616 439/77 |
| 2010/0038970 A1* | 2/2010 | Cook | ...................... | H02J 5/005 307/104 |
| 2010/0201533 A1* | 8/2010 | Kirby | ..................... | H02J 7/025 340/636.1 |
| 2010/0315178 A1* | 12/2010 | Udagawa | .................. | H01P 5/12 333/137 |
| 2011/0221547 A1* | 9/2011 | Tezuka | ............... | G06K 7/10316 333/236 |
| 2012/0153893 A1* | 6/2012 | Schatz | .................. | B60L 11/182 320/108 |
| 2012/0235504 A1* | 9/2012 | Kesler | .................... | H02J 5/005 307/104 |
| 2013/0175984 A1* | 7/2013 | Yamazaki | ............ | H04B 5/0037 320/108 |
| 2013/0229240 A1* | 9/2013 | Terada | ..................... | H01P 3/12 333/137 |
| 2014/0197695 A1* | 7/2014 | Waffenschmidt | ....... | H02J 7/025 307/104 |
| 2015/0015083 A1* | 1/2015 | Nakase | .................. | H02J 17/00 307/104 |

FOREIGN PATENT DOCUMENTS

| | | | | |
|---|---|---|---|---|
| JP | | 2010-114696 A | 5/2010 | |
| JP | WO | 2010131612 A1 * | 11/2010 | ............... H01P 1/20 |
| WO | | 2010/131612 A1 | 11/2010 | |

OTHER PUBLICATIONS

International Search Report for PCT/JP2012/008161 dated Jan. 29, 2013.

* cited by examiner

ELECTROMAGNETIC WAVE TRANSMISSION SHEET AND ELECTROMAGNETIC WAVE TRANSMISSION DEVICE

CROSS REFERENCE TO RELATED APPLICATIONS

This application is a National Stage of International Application No. PCT/JP2012/008161 filed Dec. 20, 2012, claiming priority based on Japanese Patent Application No. 2012-022506 filed Feb. 3, 2012, the contents of all of which are incorporated herein by reference in their entirety.

TECHNICAL FIELD

The present invention relates to an electromagnetic wave transmission sheet and an electromagnetic wave transmission device.

BACKGROUND ART

In an electromagnetic wave transmission device which uses a sheet configured to transmit an electromagnetic wave (hereinafter, referred to as "electromagnetic wave transmission sheet"), instability of electromagnetic wave transmission due to the generation of a standing wave in the electromagnetic wave transmission sheet has been and still is considered to be a problem.

Patent Document 1 (Japanese Unexamined Patent Publication No. 2007-281678) discloses a technique in which a resistor or an electromagnetic wave absorber is disposed in the end portion of the electromagnetic wave transmission sheet to suppress reflection of an electromagnetic wave and to reduce a standing wave.

Patent Document 2 (Japanese Unexamined Patent Publication No. 2010-114696) describes an electromagnetic wave transmission sheet in which the length of a width in a vertical direction to the traveling direction of an electromagnetic wave to be transmitted is substantially equal to a natural number multiple of half the wavelength of the electromagnetic wave to be transmitted such that a resonant state is placed in the vertical direction. The electromagnetic wave transmission sheet includes an electromagnetic wave absorbing medium which reduces reflection in the traveling direction of the electromagnetic wave to be transmitted, and does not include an electromagnetic wave absorbing medium which reduces reflection in the vertical direction to the traveling direction of the electromagnetic wave to be transmitted.

RELATED DOCUMENT

Patent Document

[Patent Document 1] Japanese Unexamined Patent Publication No. 2007-281678
[Patent Document 2] Japanese Unexamined Patent Publication No. 2010-114696

DISCLOSURE OF THE INVENTION

However, in the techniques described in Patent Documents 1 and 2, since at least some end sides of the electromagnetic wave transmission sheet become terminals, there is a problem in that electromagnetic wave energy is absorbed or discarded, and transmission efficiency of the electromagnetic wave is degraded.

The invention has been accomplished in consideration of this situation, and an object of the invention is to provide an electromagnetic wave transmission device capable of mitigating non-uniformity of electromagnetic wave strength caused by a standing wave while suppressing absorption or discarding of electromagnetic wave energy.

The invention provides an electromagnetic wave transmission sheet which is connected to an AC power source and transmits an electromagnetic wave, in which an edge portion which defines a planar shape has two long end sides which have parallel portions extending in parallel to each other, and two short end sides which have parallel portions extending in parallel to each other and are shorter than the long end sides, the two long end sides and the two short end sides are reflection terminals, the parallel portion of at least the first short end side out of the two short end sides includes a first portion and a second portion, an electromagnetic wave which propagates in a direction substantially parallel to the parallel portion of the long end sides includes a first standing wave formed by a traveling wave directed toward the first portion of the first short end side and a reflected wave reflected by the first portion and directed toward the second short end side, and a second standing wave formed by a traveling wave directed toward the second portion of the first short end side and a reflected wave reflected by the second portion and directed toward the second short end side, and the positions of the antinodes of the first standing wave and the second standing wave in a direction substantially parallel to the parallel portions of the long end sides are deviated by ¼ of the wavelength of an electromagnetic wave propagating through the electromagnetic wave transmission sheet.

The invention provides an electromagnetic wave transmission device including the electromagnetic wave transmission sheet, an input unit which is provided near the second short end side of the electromagnetic wave transmission sheet, a power transmission device which has an AC power source connected to the input unit, and a power reception device which is disposed on the electromagnetic wave transmission sheet and has a coupler configured to be coupled to at least one of an electric field and a magnetic field among electromagnetic waves leaking from the surface of the electromagnetic wave transmission sheet.

According to the invention, an electromagnetic wave transmission device which is capable of mitigating non-uniformity of electromagnetic wave strength caused by a standing wave while suppressing absorption or discarding of electromagnetic wave energy is realized.

BRIEF DESCRIPTION OF THE DRAWINGS

The above-described objects, other objects, features, and advantages will be apparent from a preferred exemplary embodiment described below and the accompanying drawings.

DESCRIPTION OF EXEMPLARY EMBODIMENTS

Figure 1:
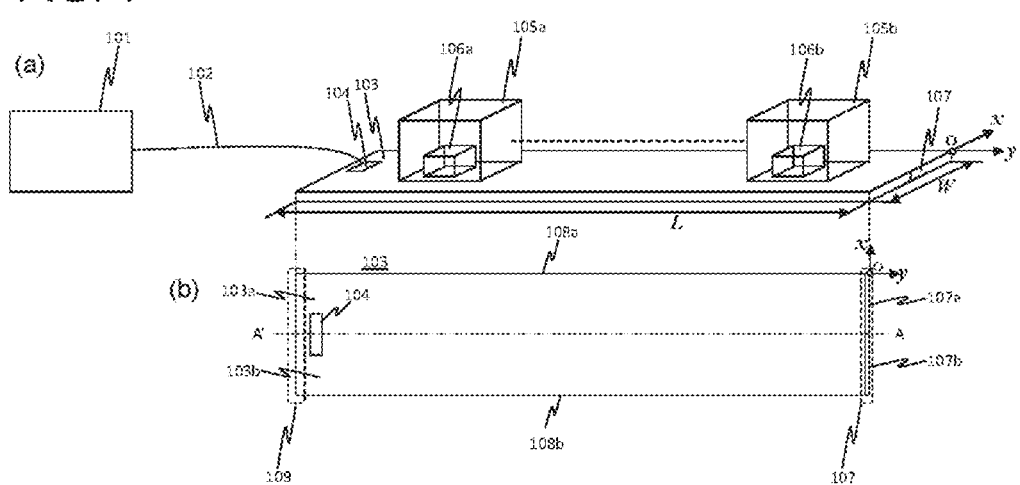
FIG. 1(a) is a diagram schematically showing the configuration of an electromagnetic wave transmission device according to a second exemplary embodiment of the invention, and FIG. 1(b) schematically shows a top view of an electromagnetic wave transmission sheet in this configuration.

Hereinafter, exemplary embodiments of the invention will be described.

First Exemplary Embodiment

An electromagnetic wave transmission device of this exemplary embodiment has a power transmission device and a power reception device.

The power transmission device has an electromagnetic wave transmission sheet, an input unit provided on the electromagnetic wave transmission sheet, and an AC power source connected to the input unit.

The planar shape of the electromagnetic wave transmission sheet is a substantially rectangular shape. That is, an edge portion which defines the planar shape of the electromagnetic wave transmission sheet has two long end sides which have parallel portions extending in parallel to each other, and two short end sides which have parallel portions extending in parallel to each other and are shorter than the long end sides. The relationship between the parallel portions of the long end sides and the parallel portions of the short end sides is, for example, perpendicular. Note that the two long end sides may or may not further have portions (for example, portions not in parallel to each other) different from the parallel portions. Similarly, the two short end sides may or may not further have portions (for example, portions not in parallel to each other) different from the parallel portions.

The input unit is provided near one short end side (second short end side) among the four end sides (two long end sides and two short end sides) along the outer circumference of the electromagnetic wave transmission sheet. The output of the AC power source is connected to the input unit.

The power reception device is disposed on the electromagnetic wave transmission sheet. When a plurality of power reception devices are disposed on the electromagnetic wave transmission sheet, the power reception devices are disposed along the long end sides of the sheet. The power reception device has a coupler which is primarily coupled to an electric field or a magnetic field among electromagnetic waves in the sheet leaking from the surface of the electromagnetic wave transmission sheet, and receives power by means of the coupler.

The four end sides of the electromagnetic wave transmission sheet are constituted by reflection terminals with no electromagnetic wave absorbing medium. A short end side (first short end side) different from the second short end side has at least two portions.

Here, in a standing wave group formed by traveling waves toward the first short end side and reflected waves reflected by the first short end side and directed toward the second short end side among the electromagnetic waves propagating through the electromagnetic wave transmission sheet substantially in parallel to the long end sides, standing waves which generate reflected waves in at least one portion of at least two portions of the first short end side and are at the substantially same position on the line segments substantially perpendicular to the long end sides of the sheet are set as a first standing wave group. In the standing wave group, standing waves which generate reflected waves in one or more portions different from a portion where the first standing wave group generates reflected waves between at least two portions of the first short end side and are at the substantially same position on the line segments substantially perpendicular to the long end sides of the sheet are set as a second standing wave.

The coupler is configured to receive power from both of at least the first standing wave group and the second standing wave group, and the interval between the position of the antinode of the first standing wave group and the position of the antinode of the second standing wave group in a direction substantially parallel to the long end sides of the electromagnetic wave transmission sheet is substantially equal to ¼ of the wavelength of the electromagnetic wave propagating through the sheet substantially in parallel to the long end sides.

Note that, when "the planar shape of the electromagnetic wave transmission sheet is a substantially rectangular shape", this is a concept including a shape in which the range of variation in a direction parallel to the long end sides is sufficiently shorter than the length of the long end sides, and the long end sides are longer than the short end sides when the short end sides have a convex shape, a concave shape, a roundabout portion, or the like, in addition to the rectangular shape in which the short end sides have a line segment shape perpendicular to the long end sides. Here, the term "sufficiently short" refers to the length equal to or less than ¼ of the long end sides. When a person skilled in the art actually manufactures the electromagnetic wave transmission sheet, it is not possible to ideally realize a perfect right angle, a perfect straight line, or the like due to a manufacturing tolerance or the like. In consideration of this situation, the term "the substantially rectangular shape" is used. Hereinafter, the reason that the terms "substantially parallel" and "substantially perpendicular" are used is the same.

The term "near the second short end side" used in the description of the installation position of the input unit indicates a state where the interval between the second short end side and the input unit is sufficiently shorter than the length of the long end sides of the electromagnetic wave transmission sheet, and for example, refers to a state where the interval between the second short end side and the input unit is the length equal to or less than ¼ of the long end sides of the electromagnetic wave transmission sheet.

The term "the position of the standing wave" indicates the position measured with the position of an antinode giving the maximum amplitude of the standing wave as a reference or the position of a node giving the minimum amplitude as a reference. Accordingly, the standing wave group in which the standing waves are at the same position on the line segments perpendicular to the long end sides of the electromagnetic wave transmission sheet indicates a sequence of standing waves in which the position coordinates of the antinodes or nodes centering on the long end sides of the electromagnetic wave transmission sheet match each other.

The frequency of an electromagnetic wave which is output from the AC power source and propagates through the electromagnetic wave transmission sheet is not limited to a single frequency, and the frequency spectrum may spread, that is, may have a bandwidth. In this case, the roughly center frequency of a frequency band may be used as a representative to set the wavelength of an electromagnetic wave propagating through the electromagnetic wave transmission sheet. Alternatively, in case of a modulated wave or the like, the frequency of a carrier wave may be used as a base. For this reason, in the above-described standing waves, there are cases where the position of the antinode or node has a width, and the amplitude does not become 0 at the node. In consideration of this situation, the standing wave groups are described to be at the substantially same position.

As the coupler, there have hitherto been an electric field coupler regarded as a dipole antenna and a magnetic field coupler regarded as a loop antenna. Although these couplers are respectively primarily coupled to an electric field and a magnetic field, in any way, it is not the case that the electric field coupler does not receive a magnetic field at all or the magnetic field coupler does not receive an electric field at all. Accordingly, in the description that "the coupler is primarily coupled to either an electric field or a magnetic field among the electromagnetic waves in the sheet leaking from the surface of the electromagnetic wave transmission sheet", the term "primarily" is used.

When a short-circuited terminal or an open terminal is created, it is needless to say that it is not possible to actually manufacture an ideal short-circuited terminal or open terminal due to a parasitic circuit element component, such as parasitic capacitance, parasitic inductance, or parasitic resistance. Accordingly, in this exemplary embodiment, it is meant that the phase has precision enough to obtain the effects of this exemplary embodiment. Specifically, this represents that the phase difference generally falls within plus or minus 20 degrees of 180 degrees. In regard to the wavelength, since there are cases where it is not possible to completely define the length due to a manufacturing tolerance or the like of the electromagnetic wave transmission sheet, or for example, where, when a modulated wave described in detail in an exemplary embodiment is input from a high-frequency power source, there is no other alternative but to define the wavelength by the carrier wave component, as described above, this means that the phase difference falls within plus or minus 20 degrees in terms of phase which has precision enough to obtain the effects of this exemplary embodiment, that is, within plus or minus 1/18 wavelength. For this reason, the description of "substantially equal to ¼ of the wavelength of the electromagnetic wave" is used.

Unlike the technique disclosed in Patent Document 2 (Japanese Unexamined Patent Publication No. 2010-114696), according to the invention, since no electromagnetic wave absorbing medium is provided on the four end sides defining the substantially rectangular shape of the electromagnetic wave transmission sheet, absorption or discarding of electromagnetic wave energy by the electromagnetic wave absorbing medium is suppressed even in the electromagnetic wave traveling in parallel to the long end sides, as well as the electromagnetic wave traveling in parallel to the short end sides of the electromagnetic wave transmission sheet.

Note that no electromagnetic wave absorbing medium is provided on the first short end side facing the second short end side, near which the input unit is provided, among the four end sides of the electromagnetic wave transmission sheet, and the first short end side becomes a reflection terminal. Accordingly, the electromagnetic wave traveling through the electromagnetic wave transmission sheet from the second short end side toward the first short end side in parallel to the long end sides of the electromagnetic wave transmission sheet is reflected by the first short end side and generates a standing wave along at least the long end sides of the electromagnetic wave transmission sheet.

However, in this exemplary embodiment, since the first short end side has at least two portions, the standing waves generated in the electromagnetic wave transmission sheet can be classified into a first standing wave group and a second standing wave group which are reflected by different portions of the first short end side. Since a configuration is made in which the interval between the position of the first standing wave group and the position of the second standing wave group substantially parallel to the long end sides of the electromagnetic wave transmission sheet is substantially equal to ¼ of the wavelength of the electromagnetic wave propagating through the sheet substantially in parallel to the long end sides, at the positions on the line segments substantially perpendicular to the long end sides of the sheet, when one standing wave group becomes an antinode, the other standing wave group becomes a node. Accordingly, by means of the antinode and the node arranged complementarily on the line segments substantially perpendicular to the long end sides of the sheet, non-uniformity of electromagnetic wave strength caused by the standing wave, when averaged and observed on the line segments substantially perpendicular to the long end sides of the sheet, is mitigated.

Since the coupler which is mounted in the power reception device disposed along the long end sides of the electromagnetic wave transmission sheet is configured to receive power from both of at least the first standing wave group and the second standing wave group, for example, even if a portion of the coupler hangs over the portion of the node, power is received from the antinodes arranged complementarily at the positions on the line segments substantially perpendicular to the long end sides of the sheet, thereby receiving power from the power transmission device.

As described above, according to the above-described configuration, it is possible to provide an electromagnetic wave transmission device in which, in a state where non-uniformity of electromagnetic wave strength caused by the standing wave generated in the sheet is mitigated, absorption or discarding of electromagnetic wave energy is suppressed even in the electromagnetic wave traveling in parallel to the long end sides, as well as in the electromagnetic wave traveling in parallel to the short end sides of the electromagnetic wave transmission sheet.

In the electromagnetic wave transmission device of this exemplary embodiment, of the first short end side of the electromagnetic wave transmission sheet, a portion where the first standing wave group is generated is constituted by a short-circuited terminal, and a portion where the second standing wave group is generated is constituted by an open terminal, whereby the first short end side can be configured to be substantially perpendicular to the long end sides of the electromagnetic wave transmission sheet. That is, at least one portion of at least two portions constituting the first short end side is constituted by a short-circuited terminal, and at least the other portion is constituted by an open terminal.

In this case, the interval between the position of the antinode of the first standing wave group and the position of the antinode of the second standing wave group in the direction substantially parallel to the long end sides of the electromagnetic wave transmission sheet is substantially equal to ¼ of the wavelength of the electromagnetic wave propagating through the sheet substantially parallel to the long end sides.

The phase of the reflected wave to the traveling wave differs by 180 degrees at the short-circuited terminal and the open terminal. Since the first short end side is configured to be substantially perpendicular to the long end sides, the positions of the standing waves in the first standing wave group and the second standing wave group with the positions of the antinode and the node as a reference are deviated from each other by ¼ wavelength measured substantially in parallel to the long end sides of the sheet. That is, a configuration in which the interval between the position of the antinode of the first standing wave group and the position of the antinode of the second standing wave group substantially parallel to the long end sides of the electromagnetic wave transmission sheet is substantially equal to ¼ of the wavelength of the electromagnetic wave propagating through the sheet substantially parallel to the long end sides is realized. Accordingly, when one standing wave group becomes a node, since the other standing wave group becomes an antinode, it is possible to mitigate non-uniformity of electromagnetic wave strength caused by the standing wave.

In the electromagnetic wave transmission device of this exemplary embodiment, of the first short end side of the electromagnetic wave transmission sheet, the portion where the first standing wave group is generated and the portion where the second standing wave group is generated are constituted by the same type of reflection terminals of either short-circuited terminals or open terminals, and the interval between the portion where the first standing wave group is generated and the portion where the second standing wave group is generated in the direction substantially parallel to the long end sides of the electromagnetic wave transmission sheet can be substantially equal to a length obtained by adding ¼ of the wavelength to an M (an integer equal to or greater than 0) multiple of half the wavelength of the electromagnetic wave traveling through the sheet substantially in parallel to the long end sides of the sheet.

With the above-described configuration, since the antinode and the node of the standing wave alternately appear at every ¼ wavelength, a configuration in which the interval between the position of the first standing wave group and the position of the second standing wave group in the direction substantially parallel to the long end sides of the electromagnetic wave transmission sheet is substantially equal to ¼ of the wavelength of the electromagnetic wave propagating through the sheet substantially in parallel to the long end sides can be realized. That is, it is possible to realize a configuration in which non-uniformity of electromagnetic wave strength caused by the standing wave is mitigated.

The same type of reflection terminals means reflection terminals at which the phase of a reflected wave generated in the end portion is the same as the phase of a traveling wave incident on the end portion where a standing wave is generated with sufficient precision, and attenuation of an incident wave, such as parasitic resistance, is sufficiently small.

In the electromagnetic wave transmission device of this exemplary embodiment, M can be set to "0 (zero)".

With this configuration, since the width of the end portion of the electromagnetic wave transmission sheet measured in parallel to the long end sides can be particularly shortened to substantially ¼ of the wavelength of the traveling electromagnetic wave, it is possible to reduce manufacturing cost of the electromagnetic wave transmission sheet, and as a result, to reduce manufacturing cost of the electromagnetic wave transmission device.

In the electromagnetic wave transmission device of this exemplary embodiment, the four end sides of the electromagnetic wave transmission sheet can be constituted by short-circuited terminals.

With this configuration, no electromagnetic waves leak from the four end sides (short-circuited terminals) of the electromagnetic wave transmission sheet. Accordingly, it is possible to reduce the influence of electromagnetic wave leakage to the surrounding environment. It is also possible to suppress change in electromagnetic wave propagation through the electromagnetic wave transmission sheet caused by change in the surrounding environment. Furthermore, since ease of manufacturing is achieved, it is possible to stably provide an electromagnetic wave transmission device with mitigated non-uniformity of electromagnetic wave strength at low cost.

Second Exemplary Embodiment

FIG. 1 is a schematic view illustrating a second exemplary embodiment of the invention. FIG. 1(a) is a schematic view illustrating the configuration of this exemplary embodiment, and FIG. 1(b) schematically shows a top view of an electromagnetic wave transmission sheet 103 in this configuration. The electromagnetic wave transmission sheet of this exemplary embodiment has a substantially rectangular shape, and in FIG. 1(a), it is assumed that the relationship of L>W is satisfied.

An AC power source 101 shown in FIG. 1(a) outputs an AC power. This output is connected to an input unit 104 of an electromagnetic wave transmission sheet 103 through a wiring 102. The input unit 104 is provided near one short end side 109 (hereinafter, a short end side near which the input unit 104 is provided is referred to as "second short end side") among the four end sides (two long end sides 108a and 108b and two short end sides 107 and 109) along the outer circumference of the electromagnetic wave transmission sheet 103. In this way, a power transmission device which includes the AC power source 101 and the electromagnetic wave transmission sheet 103 is configured.

The AC power output from the AC power source 101 is not limited to a single frequency, and the frequency spectrum may spread, that is, may have a bandwidth. In this case, the roughly center frequency of the frequency band may be used as a representative to set the wavelength of the electromagnetic wave propagating through the electromagnetic wave transmission sheet 103. Alternatively, in case of a modulated wave or the like, the frequency of a carrier wave may be used as a base.

Power reception devices 105a and 105b are disposed on the upper surface of the electromagnetic wave transmission sheet 103 substantially in parallel to the long sides of the electromagnetic wave transmission sheet 103. The number of power reception devices disposed on the upper surface of the electromagnetic wave transmission sheet 103 may be one or may be plural. In this exemplary embodiment, it is assumed that a plurality of power reception devices are disposed. Couplers 106a and 106b are respectively mounted in the power reception devices 105a and 105b. An electromagnetic wave propagating through the electromagnetic wave transmission sheet 103 leaks from the sheet surface as an AC electric field or an AC magnetic field, and power can be fed to the power reception devices 105a and 105b through the couplers 106a and 106b and the like. Since there are many prior art documents, the specific configurations of the electric field coupler and the magnetic field coupler will not be particularly described in detail.

In order to set the received powers of the power reception devices to within an appropriate range regardless of the order of the power reception devices 105a and 105b (the order when counting the power reception devices from the second short end side side) disposed along the electromagnetic wave transmission sheet 103, it is desirable that the received powers of the power reception devices 105a and 105b are sufficiently smaller than power propagating through the electromagnetic wave transmission sheet 103. In this case, power which reaches the right-end short end side 107 (a short end side different from a short end side near which the input unit 104 is provided: hereinafter, referred to as "first short end side") of the electromagnetic wave transmission sheet 103 in FIG. 1 increases. Here, as described in Patent Document 2, if the power is absorbed or discarded by an electromagnetic wave absorbing medium, power utilization efficiency becomes extremely low. In this exemplary embodiment, in order to solve this problem, the first short end side 107 of the electromagnetic wave transmission sheet 103 is made a reflection terminal, and both the long end sides 108a and 108b of the electromagnetic wave transmission sheet 103 are also made reflection terminals. With this configuration, it is possible to provide an electromagnetic wave transmission device in which absorption or discarding of electromagnetic wave energy is suppressed even in the electromagnetic wave traveling in parallel to the long end sides 108a and 108b, as well as the electromagnetic wave traveling in parallel to the first short end side 107 of the electromagnetic wave transmission sheet 103.

As in the top view of the electromagnetic wave transmission sheet 103 shown in FIG. 1(b), in this exemplary embodiment, particularly, the first short end side 107 is substantially perpendicular to the long end sides 108a and 108b of the electromagnetic wave transmission sheet 103 and is divided into at least two portions. One portion out of the two portions is made a short-circuited terminal and thus becomes a reflection terminal, and the other portion is made an open terminal and thus becomes a reflection terminal.

In FIG. 1(b), the first short end side 107 is divided into two portions of a first portion 107a and a second portion 107b (in the drawing, divided vertically into two portions). At this time, insofar as power enough to operate the power reception devices 105a and 105b is obtained on the electromagnetic wave transmission sheet 103, the first portion 107a and the second portion 107b may not particularly have the same length. Of these, for example, the first portion 107a is a short-circuited terminal, and the second portion 107b is an open terminal. The short-circuited terminal or the open terminal used herein means a short-circuited terminal or an open terminal as a reflection terminal within a range capable of being actually created by a person skilled in the art, instead of an ideal perfect reflection terminal with no parasitic circuit element component, such as parasitic capacitance, parasitic inductance, or parasitic resistance.

Here, an upper portion of the electromagnetic wave transmission sheet 103 separated by a one-dot-chain line A-A' shown in FIG. 1(b) is defined as "first sheet 103a", and a lower portion is defined as "second sheet 103b". Needless to say, the one-dot-chain line is a virtual line, and actually, is not present on the electromagnetic wave transmission sheet 103. The region division is just for describing the action of this exemplary embodiment, and is not required in an actual sheet.

However, a cut may be intentionally made from the first short end side 107 so as not to reach the input unit 104, and the electromagnetic wave transmission sheet 103 may operate in a state of being basically separated into the first sheet 103a and the second sheet 103b. With this, since it is possible to reduce the mutual influence of a standing wave generated in the first sheet 103a and a standing wave generated in the second sheet 103b, it is possible to stably mitigate non-uniformity of electromagnetic wave strength caused by the standing wave.

Though not shown in FIG. 1(b), the couplers 106a and 106b are disposed over the first sheet 103a and the second sheet 103b of the electromagnetic wave transmission sheet 103. For example, when the couplers 106a and 106b are electric field couplers, the couplers 106a and 106b can be coupled to both of an AC electric field due to an electromagnetic wave leaking from the surface of the first sheet 103a and an AC electric field due to an electromagnetic wave leaking from the surface of the second sheet 103b. Accordingly, power can be fed from the surface of the first sheet 103a and the surface of the second sheet 103b to the power reception devices 105a and 105b through the couplers 106a and 106b and the like. In this exemplary embodiment, although a configuration is made in which one coupler is mounted in one power reception device in order to suppress manufacturing cost of an electromagnetic wave transmission device, the invention is not limited thereto. For example, a coupler exclusive for the first sheet 103a and a coupler exclusive for the second sheet 103b may be mounted in the power reception device, that is, a plurality of couplers may be mounted in one power reception device in conformity with the number of divided portions of the first short end side 107 or the number of standing wave groups.

In this exemplary embodiment, although the number of AC power sources 101 or input units 104 is one in order to suppress manufacturing cost of an electromagnetic wave transmission device, the invention is not limited thereto. As described above, in order to reduce the mutual influence of the position of a node generated in the first sheet 103*a* and the position of a node generated in the second sheet 103*b*, the electromagnetic wave transmission sheet 103 may be completely separated into upper and lower portions along the one-dot-chain line A-A' of FIG. 1(*b*), and the first sheet 103*a* and the second sheet 103*b* may be completely separately operated. In this case, it is desirable that the input units are provided separately in the first sheet 103*a* and the second sheet 103*b*. The input of the AC power to the separate input units may be performed by branching off the output of one AC power source 101, or two AC power sources may be used and the AC power may be input from the respective power sources to the input units.

In this exemplary embodiment, the AC power which is output from the AC power source 101 and input to the input unit 104 through the wiring 102 primarily travels toward the first short end side 107. Here, the reason that the term "primarily" is used is that, although a component traveling in an x direction (see FIG. 1) while being reflected by the long end sides 108*a* and 108*b* and a component traveling in a y direction are combined and generally travel obliquely, since the electromagnetic wave transmission sheet 103 has a substantially rectangular shape, the traveling wave is regarded as a traveling wave from the input unit 104 toward the first short end side 107 in a broad view.

The traveling wave of the AC power, which reaches the first short end side 107, is reflected by the first portion 107*a* (short-circuited terminal) or the second portion 107*b* (open terminal). Here, since the first short end side 107 is substantially perpendicular to the long end sides 108*a* and 108*b* of the electromagnetic wave transmission sheet 103, at this time, as to a voltage, fixed end reflection is made in the first portion 107*a* (short-circuited terminal), and free end reflection is made in the second portion 107*b* (open terminal), and as to a current, free end reflection is made in the first portion 107*a* (short-circuited terminal), and fixed end reflection is made in the second portion 107*b* (open terminal). That is, if one of the first portion 107*a* (short-circuited terminal) and the second portion 107*b* (open terminal) is a free end, the other portion becomes a fixed end.

Figure 2:
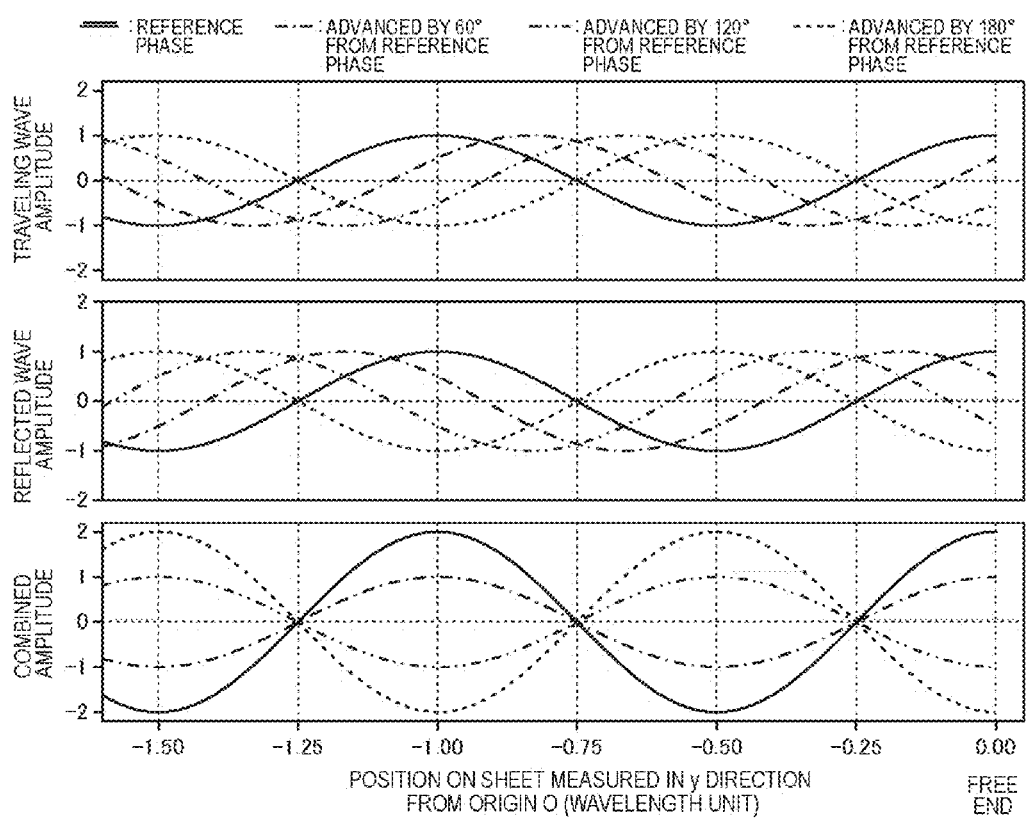
FIG. 2 is a graph schematically showing the states of a traveling wave, a reflected wave, and a standing wave formed by a combination thereof at a free end according to the second exemplary embodiment of the invention.
Figure 3:
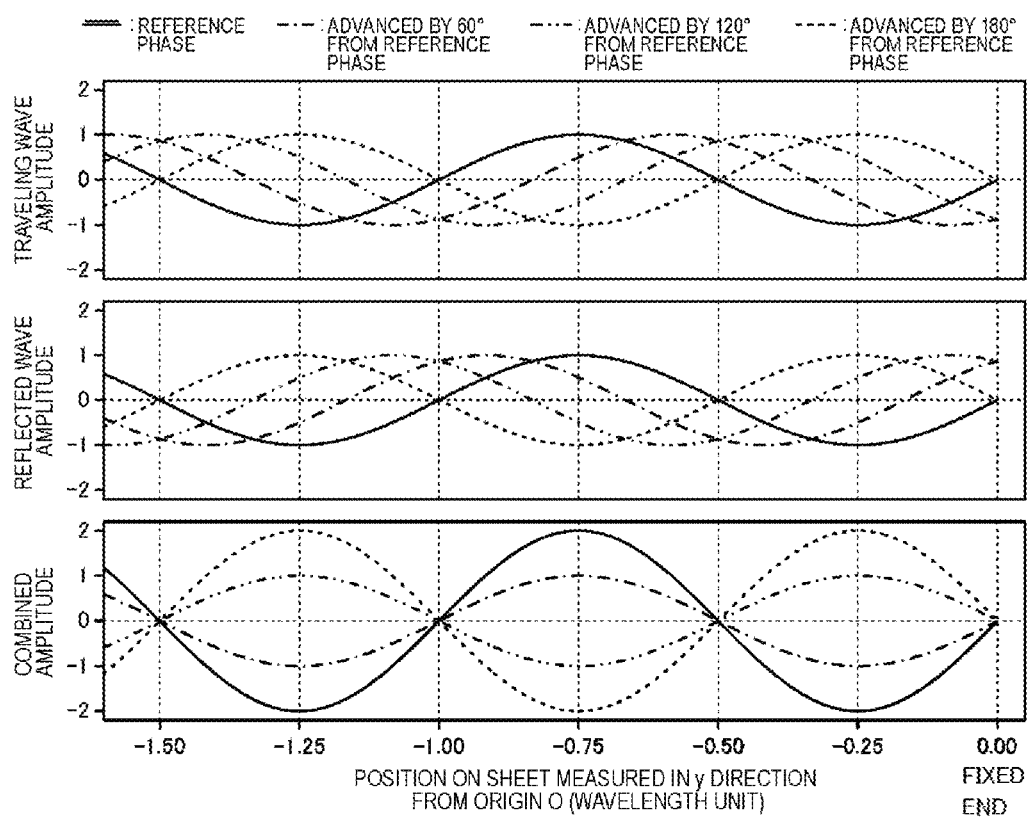
FIG. 3 is a graph schematically showing the states of a traveling wave, a reflected wave, and a standing wave formed by a combination thereof at a fixed end according to the second exemplary embodiment of the invention.

In order to describe the above-described situation, FIG. 2 shows the states of a traveling wave, a reflected wave, and a standing wave formed by a combination thereof when a reflection end is a free end. FIG. 3 shows the states of a traveling wave, a reflected wave, and a standing wave formed by a combination thereof when a reflection end is a fixed end.

In FIGS. 2 and 3, the horizontal axis represents the position on the sheet measured in the y direction from the origin O of FIG. 1 in units of the wavelength of the electromagnetic wave traveling through the electromagnetic wave transmission sheet 103 in the y direction. Accordingly, a free end of FIG. 2 and a fixed end of FIG. 3 correspond to the position of O on the horizontal axis, that is, the first short end side 107.

FIGS. 2 and 3 have three graphs, and in FIGS. 2 and 3, amplitude of a traveling wave, amplitude of a reflected wave, and the amplitude of a combined wave thereof are plotted from the top. A solid-line graph represents amplitude of an electromagnetic wave having a phase giving the maximum amplitude of the standing wave, and with this phase as a reference, a one-dot-chain line represents a phase-advanced state by 60°, a two-dot-chain line represents a phase-advanced state by 120°, and a broken line represents a phase-advanced state by 180°. In order to simply describe the action of this exemplary embodiment, in FIGS. 2 and 3, a graph is drawn as an ideal perfect reflection terminal. It is well known that it is not possible to realize an ideal reflection terminal with no parasitic circuit element component, such as parasitic capacitance, parasitic inductance, or parasitic resistance, and the short-circuited terminal or the open terminal is a short-circuited terminal or an open terminal as a reflection terminal within a range capable of being actually created by a person skilled in the art. However, it is needless to say that, even in the actual reflection terminal, the action described in this exemplary embodiment is generally reproduced, and the same effects are provided.

In FIG. 2, the traveling wave (uppermost graph) is reflected in the same phase as the traveling wave at the free end and forms a reflected wave (middle graph). By a combination of the traveling wave and the reflected wave, a standing wave (lowermost graph) is generated in the y direction inside the electromagnetic wave transmission sheet 103. The antinode of the standing wave appears at the free end, that is, at the position coordinate 0.00 (first short end side 107), and then appears at every half wavelength of the position coordinates −0.50, −1.00, and −1.50. On the other hand, the node appears at −¼ wavelength in the y direction from the position coordinate 0.00 (first short end side 107), that is, at the point of the position coordinate −0.25, and then appears at every half wavelength of the position coordinates −0.75 and −1.25.

In FIG. 3, the traveling wave (uppermost graph) is reflected in a phase advanced by 180° from the traveling wave at the fixed end and forms a reflected wave (middle graph). By a combination of the traveling wave and the reflected wave, a standing wave (lowermost graph) is generated in the y direction inside the electromagnetic wave transmission sheet 103. The node of the standing wave appears at the fixed end, that is, at the position coordinate 0.00 (first short end side 107), and then appears at every half wavelength of the position coordinates −0.50, −1.00, and −1.50. On the other hand, the antinode appears at −¼ wavelength in the y direction from the position coordinate 0.00 (first short end side 107), that is, at the point of the position coordinate −0.25, and then appears at every half wavelength of the position coordinates −0.75 and −1.25.

Figure 4:
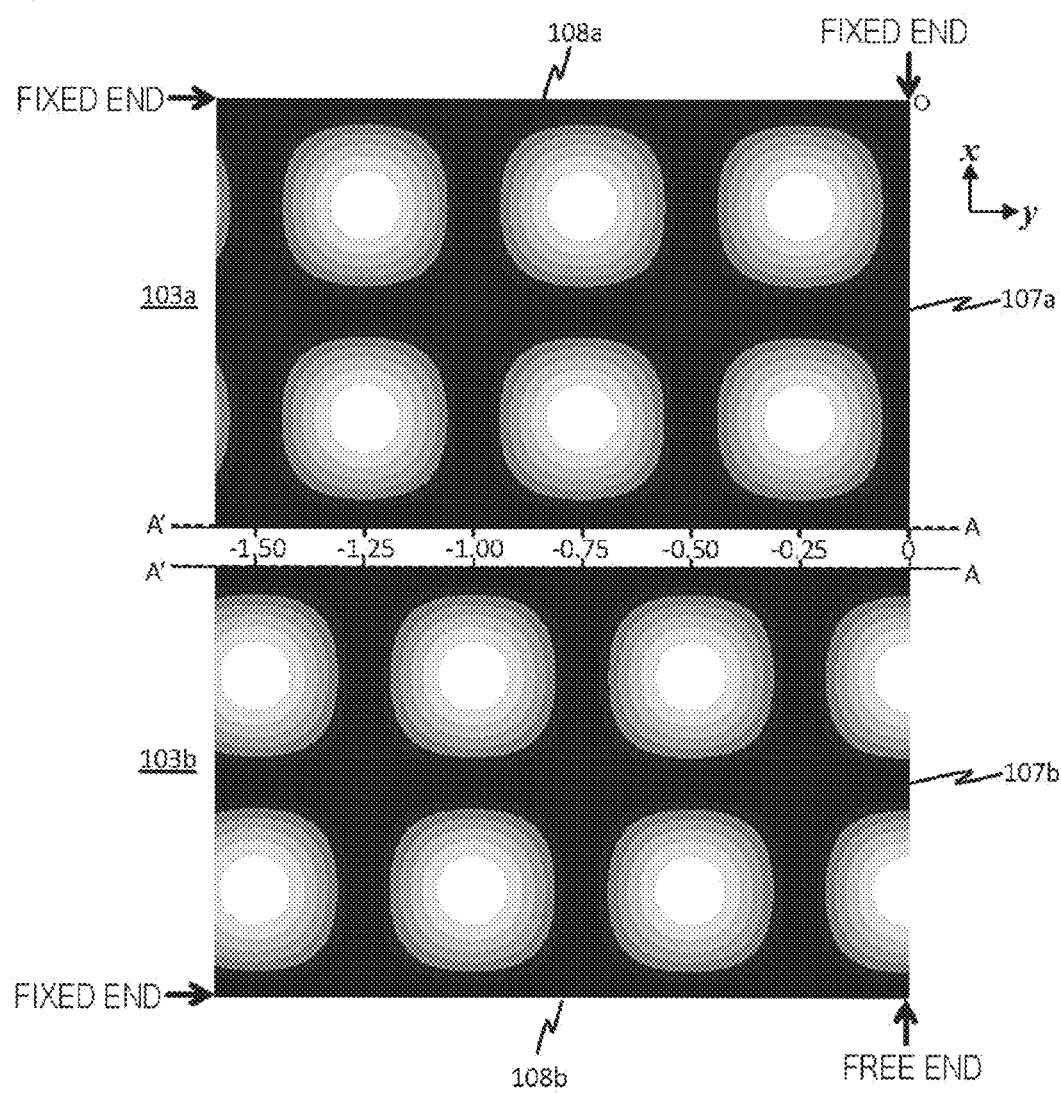
FIG. 4 is a grayscale view showing the state of a standing wave near a first short end side in the electromagnetic wave transmission sheet according to the second exemplary embodiment of the invention.

For description in more detail, a grayscale view of the states of standing waves in the first sheet 103*a* and the second sheet 103*b* near the first portion 107*a* and the second portion 107*b* of the first short end side 107 is shown in FIG. 4. As a result of confirming experimentally, since it is understood that the mutual influence of the standing wave generated in the first sheet 103*a* and the standing wave generated in the second sheet 103*b* is sufficiently small, in FIG. 4, the influence is neglected.

The horizontal axis described between the upper and lower grayscale views represents the position on the sheet measured in the y direction from the origin O (first short end side 107) of FIG. 1 in units of the wavelength of an electromagnetic wave traveling through the electromagnetic wave transmission sheet 103 in the y direction. The vertical axis represents the x axis of the first sheet 103*a* and the second sheet 103*b*. In this drawing, as an example, a case where the size in the x-axis direction of the first sheet 103*a* and the second sheet 103*b* is one wavelength is plotted. The grayscale in the drawing represents the maximum amplitude of the absolute value of the voltage, and represents that the maximum amplitude of the absolute value of the voltage increases from a black portion toward a white portion.

As described above, the first portion 107a of the first short end side 107 is a short-circuited terminal, the second portion 107b is an open terminal, and in FIG. 4, this corresponds to a case where both the long end sides 108a and 108b of the electromagnetic wave transmission sheet 103 are short-circuited. As a result, in the first sheet 103a, the node displayed to be black in the drawing appears at the position coordinate 0.00 (first portion 107a), and then appears at every half wavelength of the position coordinates −0.50, −1.00, and −1.50. The antinode displayed to be white appears at the point of the position coordinate −0.25, and then appears at every half wavelength of the position coordinates −0.75 and −1.25. On the other hand, in the second sheet 103b, the antinode displayed to be white in the drawing appears at the position coordinate 0.00 (second portion 107b), and then appears at every half wavelength of the position coordinates −0.50, −1.00, and −1.50. The node displayed to be black appears at the point of the position coordinate −0.25, and then appears at every half wavelength of the position coordinates −0.75 and −1.25.

Note that, in FIG. 4, as an example, since a case where the size in the x-axis direction of the first sheet 103a and the second sheet 103b is one wavelength is plotted, both sheets become nodes on the line (the boundary of the first sheet 103a and the second sheet 103b) indicated by A-A'. Accordingly, it is possible to reduce the mutual influence of the standing wave generated in the first sheet 103a and the standing wave generated in the second sheet 103b. However, this exemplary embodiment is not limited to this condition, and it is needless to say that this exemplary embodiment may be applied to a case where there is the mutual influence of the standing wave generated in the first sheet 103a and the standing wave generated in the second sheet 103b.

As shown in the above-described drawings, in comparison between when the state of the first short end side 107 is a free end (second portion 107b) and when the state of the first short end side 107 is a fixed end (first portion 107a), if the position coordinates on the sheets measured in the y direction from the origin O are the same, when one position coordinate is an antinode, a node appears at the other position coordinate, and when one position coordinate is a node, an antinode appears at the other position coordinate. That is, in comparison between the first sheet 103a in which the first short end side 107 becomes a short-circuited terminal (first portion 107a) and the second sheet 103b in which the first short end side 107 becomes an open terminal (second portion 107b), if the position coordinates on the sheets measured in the y direction from the origin O are the same, when one position coordinate is an antinode, a node appears at the other position coordinate, and when one position coordinate is a node, an antinode appears at the other position coordinate. In this way, compared to when the first short end side 107 is one type of reflection terminal, in this exemplary embodiment, since the antinode and the node complementarily appear in the first sheet 103a and the second sheet 103b, it is possible to provide an electromagnetic wave transmission device in which non-uniformity of electromagnetic wave strength caused by the standing wave is mitigated.

As described above, the couplers 106a and 106b which are mounted in the power reception devices 105a and 105b disposed along the long end sides 108a and 108b of the electromagnetic wave transmission sheet 103 are disposed over the first sheet 103a and the second sheet 103b, and can receive power from both the first sheet 103a and the second sheet 103b. Accordingly, for example, even if a portion of the couplers 106a and 106b hangs over the portion where one of the first sheet 103a and the second sheet 103b is a node, power is received from the antinodes of the other sheet complementarily arranged at the positions on the line segments substantially perpendicular to the long sides (end portions 108a and 108b) of the sheet, thereby receiving power from the power transmission device.

Since no electromagnetic wave absorbing medium is provided in the four end sides (two long end sides 108a and 108b and two short end sides 107 and 109) along the outer circumference of the electromagnetic wave transmission sheet 103, it is possible to provide an electromagnetic wave transmission device in which absorption or discarding of electromagnetic wave energy is suppressed even in the traveling direction of the electromagnetic wave, as well as in the direction perpendicular to the traveling direction of the electromagnetic wave.

As described above, the input units 104 are provided separately in the first sheet 103a and the second sheet 103b, and in general, the standing waves generated inside the first sheet 103a and the second sheet 103b have separate phases between when the input of the AC power to the separate input units 104 is performed using the two AC power sources and when the input of the AC power is performed by branching off the output of one AC power source 101. For example, the time at which the reference phase indicated by a solid line in FIGS. 2 and 3 is realized differs between the first sheet 103a and the second sheet 103b. However, the positions of the standing waves generated inside the first sheet 103a and the second sheet 103b, particularly, the positions of the antinode and the node do not depend on the phase. Accordingly, the effects of this exemplary embodiment are obtained regardless of the number of input units 104 or power sources.

The reflected power which is reflected by the first short end side 107 and returns to the input unit 104 may return to the AC power source 101. Furthermore, the reflected power may be separated from the traveling wave power and recovered using a device, such as a circulator. With this configuration, it is possible to increase power utilization efficiency.

In this exemplary embodiment, although the first short end side 107 is divided into the two portions of the first portion 107a and the second portion 107b, one portion being made a short-circuited terminal and the other portion being made an open terminal, the configuration is not limited thereto.

For example, the first short end side 107 in FIG. 1(b) may be divided into portions of an odd number, and the portions may be assigned a short-circuited terminal and an open terminal alternately from the top. In this case, for example, both the long end sides 108a and 108b of the electromagnetic wave transmission sheet 103 are short-circuited, and the influence of an electromagnetic wave leaking from the long end sides 108a and 108b or an electromagnetic wave entering the sheet from the periphery of the electromagnetic wave transmission sheet 103 is eliminated, thereby securing a stable operation. As the extensions of the long end sides 108a and 108b, the upper and lower end portions of the first short end side 107 connected to the long end sides 108a and 108b may be made short-circuited terminals. In this case, it is possible to easily shield the corner portions of the electromagnetic wave transmission sheet 103 where an electromagnetic wave is likely to leak.

Alternatively, the first short end side 107 in FIG. 1(b) may be divided into an odd number of portions, an open terminal and a short-circuited terminal may be alternately disposed from the top, and both the long end sides 108a and 108b may be opened. In this case, unlike short-circuiting, since the opening may be made in the cut state of the electromagnetic wave transmission sheet 103 as it is, it is possible to achieve manufacturing at low cost.

Alternatively, the first short end side 107 in FIG. 1(b) may be divided into an even number of portions, a short-circuited terminal and an open terminal may be alternately disposed from the top, simultaneously, the long end side 108a may be made a short-circuited terminal, and the long end side 108b may be made an open terminal.

Similarly, in regard to the number of power sources or the number of input units 104, as described above, various configurations in which the effects of this exemplary embodiment are similarly obtained are considered, and when the first short end side 107 is divided into an odd number of portions, the number of input units 104 or the number of AC power sources may be accordingly changed in various ways.

The second short end side 109 (see FIG. 1(b)) of the electromagnetic wave transmission sheet 103 near the input unit 104 may be short-circuited. In this case, in order to feed power from the AC power source 101 to the electromagnetic wave transmission sheet 103 through the input unit 104 efficiently, it is desirable to perform design that the installation position of the input unit 104 on the electromagnetic wave transmission sheet 103 is slightly moved toward the first short end side 107 such that impedance matching is made, and a matching circuit, such as a stub, is further provided as necessary. With this design, it is possible to make the second short end side 109 of the electromagnetic wave transmission sheet 103 be short-circuited without causing a problem with the operation of the electromagnetic wave transmission device, and to reduce the interdependence of the surrounding environment and the electromagnetic wave propagation through the electromagnetic wave transmission sheet 103. The second short end side 109 may be opened. In this case, since short-circuiting is not required, it is possible to manufacture the electromagnetic wave transmission sheet 103 at low cost.

Similarly to the first short end side 107, the second short end side 109 may be made by a combination of a short-circuited terminal and an open terminal. In this case, it is desirable that the configurations of the reflection terminals of the first short end side 107 and the second short end side 109 have low symmetry. It is more desirable that the configurations of the reflection terminals of the first short end side 107 and the second short end side 109 have no line symmetry or rotation symmetry. With this, it is possible to further suppress the appearance of an unintended node, and to provide an electromagnetic wave transmission device in which non-uniformity of electromagnetic wave strength caused by the standing wave is mitigated. For example, if n and m are different odd numbers equal to or greater than 1 and are relatively prime, as described above, a configuration in which the first short end side 107 is divided into n portions, the second short end side 109 is divided into m portions, and a short-circuited terminal and an open terminal are alternately disposed from the top may be made. In this case, since the first short end side 107 and the second short end side 109 are different in the number of divisions, and the numbers of divisions are relatively prime, the configurations of the reflection terminals of the first short end side 107 and the second short end side 109 may be made a configuration having no line symmetry or rotation symmetry.

The reflection terminal is not limited to a short-circuited terminal and an open terminal. As in the structure of the sheet 103 described in Patent Document 2 (Japanese Unexamined Patent Publication No. 2010-114696), an inductor or a capacitor may be inserted and connected between a mesh-like conductor portion directly below an insulating film on the surface of the electromagnetic wave transmission sheet 103 and a sheetlike conductor portion disposed as a ground surface below the electromagnetic wave transmission sheet 103, whereby the phase difference between the reflected wave and the traveling wave may not be 0 degrees or 180 degrees compared to a short-circuited terminal or an open terminal. When the meshlike conductor portion directly below the insulating film on the surface of the electromagnetic wave transmission sheet 103 is short-circuited to the sheetlike conductor portion disposed as the ground surface below the electromagnetic wave transmission sheet 103, the reflection terminal becomes a short-circuited terminal, and when the meshlike conductor portion is insulated from the sheetlike conductor portion disposed as the ground surface below the electromagnetic wave transmission sheet 103, the reflection terminal becomes an insulation terminal.

In Patent Document 2 (Japanese Unexamined Patent Publication No. 2010-114696), the insulating film is described as a protective layer made of resin or the like. With the loading of the inductor or the capacitor on the first short end side 107 as a combination of the reflection terminals different from a short-circuited terminal and an open terminal, similarly to the above-described combination of the short-circuited terminal and the open terminal, a configuration in which an antinode and a node are arranged complementarily can be realized.

With the loading of the inductor or the capacitor on the first short end side 107, the position of the standing wave can be freely operated. That is, the positions of the antinode and the node of the standing wave can be freely disposed. With this, when the first short end side 107 is constituted only by two types of a fixed end and a free end, it is possible to further reduce remaining unmitigated non-uniformity of electromagnetic wave strength, that is, ripple, using this configuration. For example, in this exemplary embodiment, as an example, although the first short end side 107 is divided into the two portions of the first portion 107a and the second portion 107b, the first short end side 107 may be further divided into a large number of portions, and the end portion may be made a reflection terminal loaded with an inductor or a capacitor. If an antinode is further added at a position, at which the remaining received power is lowered by a combination of a short-circuited terminal and an open terminal, by this configuration, it is possible to provide an electromagnetic wave transmission device in which non-uniformity of electromagnetic wave strength caused by the standing wave is mitigated.

The inductor or the capacitor may be, for example, a variable element, such as a variable coil, a variable capacitor, or a trimmer capacitor. In this case, inductance or capacitance is adjusted as necessary even after manufacturing, thereby adjusting the position of the standing wave.

While the width W (the length of the first short end side 107 and the second short end side 109) of the short sides of the electromagnetic wave transmission sheet 103 is not particularly limited, as in an example shown in FIG. 4, when the reflection terminals of the long end sides 108a and 108b are of the same type, the width W of the short sides of the electromagnetic wave transmission sheet 103 may be substantially equal to a natural number multiple of half the wavelength of an electromagnetic wave propagating through the electromagnetic wave transmission sheet 103 in the x direction. Accordingly, an electromagnetic wave is reflected on the long end sides 108a and 108b of the electromagnetic wave transmission sheet 103 to become a resonance state in a horizontal width direction, and the distribution in the horizontal width direction of the electromagnetic field of the electromagnetic wave transmission sheet 103 is stabilized. Accordingly, an electric field or magnetic field distribution leaking from the electromagnetic wave transmission sheet 103 is stabilized.

The reason that the term "substantially equal" is used is that the frequency spectrum of an electromagnetic wave propagating through the electromagnetic wave transmission sheet 103 may spread, that is, may have a bandwidth, and in this case, an electromagnetic wave propagating through the electromagnetic wave transmission sheet 103 could not be expressed as a single wavelength. In this case, the wavelength corresponding to the roughly center frequency of the frequency band may be used as a representative to set the wavelength of the electromagnetic wave propagating through the electromagnetic wave transmission sheet 103. Alternatively, in case of a modulated wave or the like, the wavelength corresponding to the frequency of a carrier wave may be used. In order that the electromagnetic wave is reflected on the long end sides 108a and 108b of the electromagnetic wave transmission sheet 103 to become the resonance state in the horizontal width direction, as described above, the termination method of the two long end sides 108a and 108b of the electromagnetic wave transmission sheet 103 may be set so that different reflection terminals such that one long end side is short-circuited and the other long end side is open, and the width of the short sides may be substantially equal to an odd number multiple of ¼ wavelength of the electromagnetic wave. In this case, the same effects as described above are obtained.

Third Exemplary Embodiment

Figure 5:
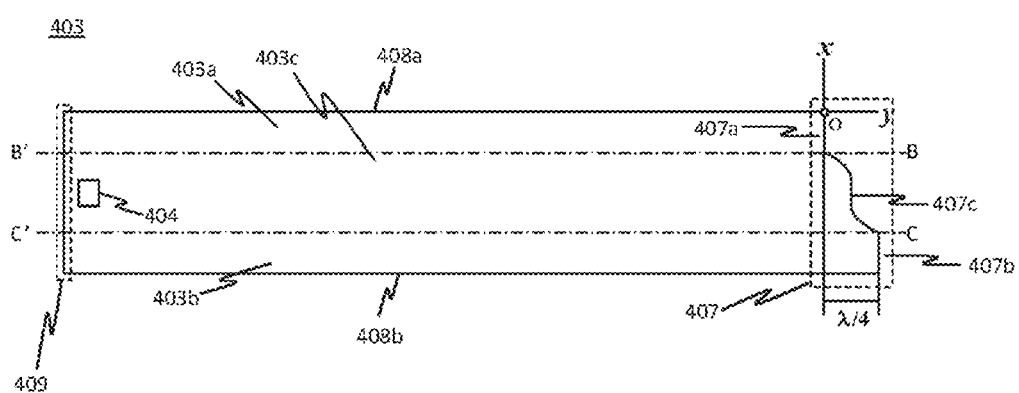
FIG. 5 is a diagram schematically showing a top view of an example of an electromagnetic wave transmission sheet in the configuration of an electromagnetic wave transmission device according to a third exemplary embodiment of the invention.

FIG. 5 is a diagram schematically showing a top view of an example of an electromagnetic wave transmission sheet 403 having a substantially rectangular shape in the configuration of an electromagnetic wave transmission device according to the third exemplary embodiment of the invention. It is assumed that the other configuration of an electromagnetic wave transmission device of this exemplary embodiment conforms to the first exemplary embodiment An input unit 404 is provided near a second short end side 409 among four end sides (two long end sides 408a and 408b and two short end sides 407 and 409) defining a substantially rectangular shape of the electromagnetic wave transmission sheet 403 of FIG. 5. The output of an AC power source (not shown) is connected to the input unit 404. Note that an AC power output from the AC power source is not limited to a single frequency, and the frequency spectrum may spread, that is, may have a bandwidth. In this case, the roughly center frequency of the frequency band may be used as a representative to set the wavelength of the electromagnetic wave propagating through the electromagnetic wave transmission sheet 403. Alternatively, in case of a modulated wave or the like, the frequency of a carrier wave may be used as a base.

In order to allow the received powers of the power reception devices to fall within an appropriate range regardless of the order of a plurality of power reception devices disposed along the electromagnetic wave transmission sheet 403, it is desirable that the received powers of the power reception devices are sufficiently smaller than power propagating through the electromagnetic wave transmission sheet 403. In this case, power which reaches the first short end side 407 of the electromagnetic wave transmission sheet 403 in FIG. 5 increases, and if the power is simply absorbed or discarded by an electromagnetic wave absorbing medium, power utilization efficiency becomes extremely low. In this exemplary embodiment, in order to solve this problem, the first short end side 407 of the electromagnetic wave transmission sheet 403 is made a reflection terminal, and both the two long end sides 408a and 408b of the electromagnetic wave transmission sheet 403 having a substantially rectangular shape are made reflection terminals.

As in the top view of the electromagnetic wave transmission sheet 403 shown in FIG. 5, in this exemplary embodiment, the first short end side 407 facing the second short end side 409, near which the input unit 404 is provided, has three portions (first portion 407a, second portion 407b, and third portion 407c). Of these, the interval between the first portion 407a and the second portion 407b in a direction (a y direction shown in FIG. 5) parallel to the long end sides 408a and 408b is substantially equal to ¼ of the wavelength λ of the electromagnetic wave traveling through the electromagnetic wave transmission sheet 403 in parallel to the long end sides 408a and 408b. Although the action of this exemplary embodiment described below is established even when the interval in the y direction is substantially equal to a length obtained by adding ¼ of the wavelength λ to an M (an integer equal to or greater than 0) multiple of half the wavelength λ of the electromagnetic wave, when the interval is substantially equal to ¼ wavelength, in particular, it is possible to shorten the width in the y direction of the end portions of the electromagnetic wave transmission sheet 403. Here, in regard to the term "substantially equal", as described above, a case where the wavelength is merely a representative value or a manufacturing tolerance or the like of the electromagnetic wave transmission sheet 403 is taken into consideration.

All of the first portion 407a, the second portion 407b, and the third portion 407c of the first short end side 407 are made the same type of terminals of either short-circuited terminals or open terminals.

Here, three regions of the electromagnetic wave transmission sheet 403 separated by one-dot-chain lines B-B' and C-C' shown in FIG. 5 are defined as "first sheet 403a", "third sheet 403c", and "second sheet 403b" in order from the top of the drawing. The one-dot-chain lines B-B' and C-C' are parallel to the long end sides 408a and 408b of the electromagnetic wave transmission sheet 403, and are located between the first portion 407a and the third portion 407c of the first short end side 407 and between the third portion 407c and the second portion 407b. Needless to say, the one-dot-chain lines are virtual lines, and actually, are not present on the electromagnetic wave transmission sheet 403. The region division is just for describing the action of the exemplary embodiment, and is not required in an actual sheet.

However, a cut may be intentionally made from the first short end side 407 so as not to reach the input unit 404, and the electromagnetic wave transmission sheet 403 may operate in a state of being generally separated into three portions. With this, since it is possible to reduce the mutual influence of the position of a node generated in the first sheet 403a and the position of a node generated in the second sheet 403b, it is possible to stably mitigate non-uniformity of electromagnetic wave strength caused by the standing wave. At this time, insofar as power enough to operate the power reception devices is obtained on the electromagnetic wave transmission sheet 403, the lengths of the first portion 407a, the second portion 407b, and the third portion 407c of the first short end side 407 in a direction substantially perpendicular to the long end sides 408a and 408b of the electromagnetic wave transmission sheet 403 may not be the same.

As in the first exemplary embodiment, a coupler which is not shown in FIG. 5 is disposed over a first sheet 403a, a second sheet 403b, and a third sheet 403c. When a coupler is an electric field coupler, the coupler is coupled to an AC electric field or an AC magnetic field caused by an electromagnetic wave leaking from the surface of each sheet. Accordingly, power can be fed from all of the first sheet 403a, the second sheet 403b, and the third sheet 403c to the power reception devices through the coupler. In this exemplary embodiment, the number of couplers which are mounted in one power reception device is, not particularly limited, equal to or greater than one. For example, dedicated couplers may be prepared in conformity with the number of divided portions or the number of standing wave groups and may be mounted in one power reception device.

In this exemplary embodiment, the number of input units 404 provided in the electromagnetic wave transmission sheet 403, or the number of AC power sources connected to the input units 404 is not limited to one. For example, in order to reduce the mutual influence between the standing waves generated in the first sheet 403a, the second sheet 403b, and the third sheet 403c, the electromagnetic wave transmission sheet 403 may be completely separated along the one-dot-chain lines B-B' and C-C' of FIG. 5, and the first sheet 403a, the second sheet 403b, and the third sheet 403c may be completely separately operated. In this case, it is desirable that the input units 404 are provided separately for the respective sheets. The input of the AC power to the separate input units 404 may be performed by branching off the output of one AC power source, or three AC power sources may be used and the AC power may be input from the respective power sources to the input units.

In this exemplary embodiment, the AC power which is output from the AC power source (not shown) and input to the input unit 404 primarily travels toward the first short end side 407. Here, the reason that the term "primarily" is used is that, although a component traveling in an x direction (see FIG. 5) while being reflected by the long end sides 408a and 408b and a component traveling in a y direction are combined and generally travel obliquely, since the electromagnetic wave transmission sheet 403 has a substantially rectangular shape, the traveling wave is regarded as a traveling wave from the input unit 404 toward the first short end side 407 in a broad view.

The traveling wave of the AC power, which reaches each of the first portion 407a, the second portion 407b, and the third portion 407c of the first short end side 407, is reflected. When the first short end side 407 is a short-circuited terminal, as to a voltage, fixed end reflection is made, and as to a current, free end reflection is made. Conversely, when the first short end side 407 is an open terminal, as to a voltage, free end reflection is made, and as to a current, fixed end reflection is made. Accordingly, in the following description of the operation, free end reflection will be first described, and fixed end reflection will be then described.

Figure 6:
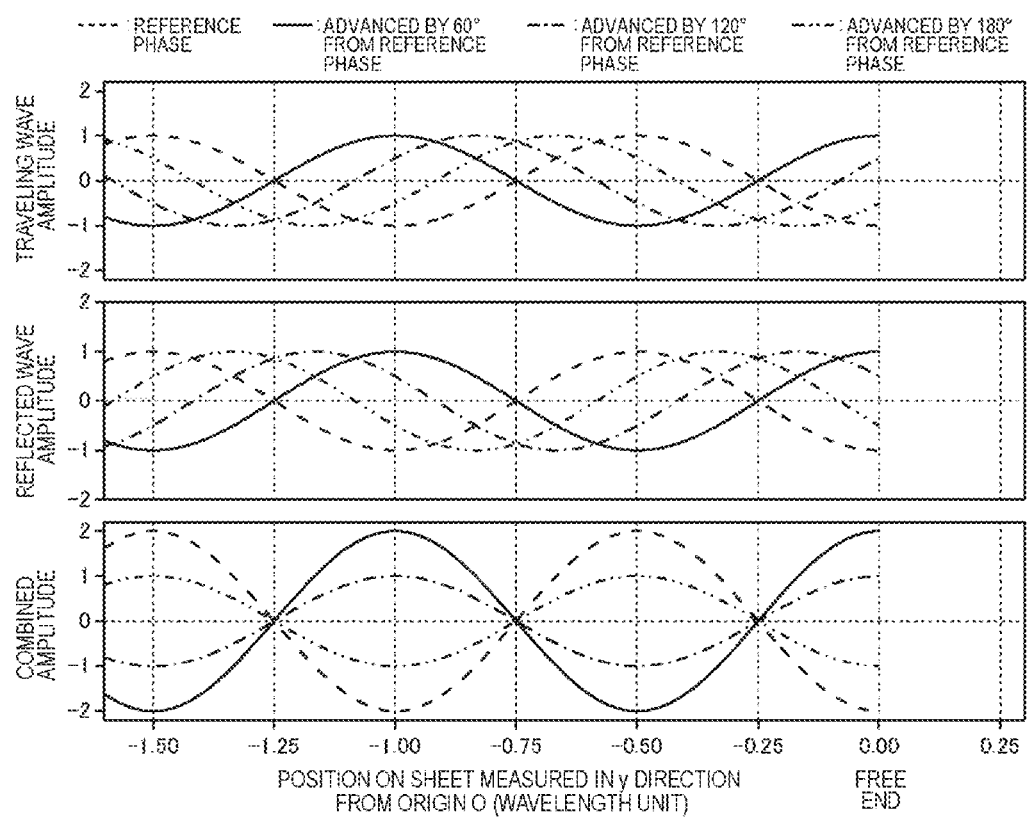
FIG. 6 is a graph schematically showing the states of a traveling wave, a reflected wave, and a standing wave formed by a combination thereof in an electromagnetic wave transmission sheet according to the third exemplary embodiment of the invention when a first short end side is a free end.
Figure 7:
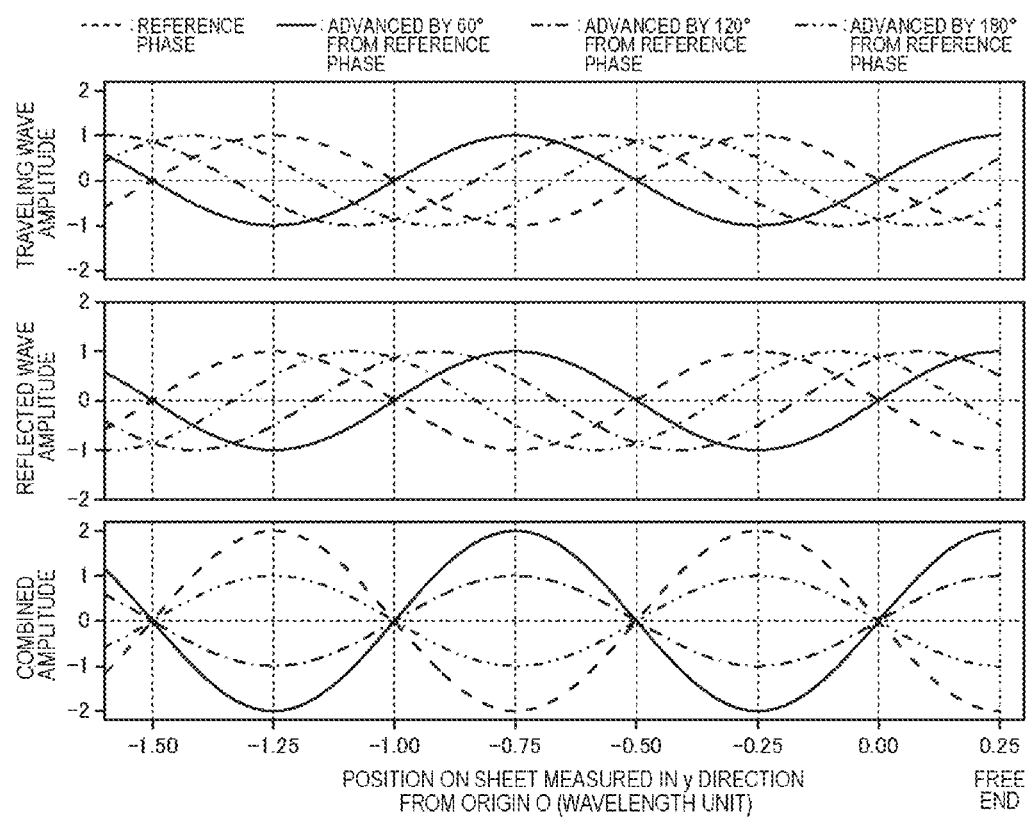
FIG. 7 is a graph schematically showing the states of a traveling wave, a reflected wave, and a standing wave formed by a combination thereof in an electromagnetic wave transmission sheet according to the third exemplary embodiment of the invention when a first short end side is a free end.

In order to describe the operation of this exemplary embodiment, a graph illustrating amplitude of free end reflection in the first portion 407a of the first short end side 407 is shown in FIG. 6, and a graph illustrating amplitude of free end reflection in the second portion 407b is shown in FIG. 7. FIGS. 6 and 7 have three graphs, and in FIGS. 6 and 7, amplitude of a traveling wave, amplitude of a reflected wave, and amplitude of a combined wave thereof are plotted from the top. The horizontal axis represents the position on the electromagnetic wave transmission sheet 403 measured in the y direction from the origin O of FIG. 5 in units of the wavelength λ of the electromagnetic wave traveling through the electromagnetic wave transmission sheet 403 in the y direction. A solid-line graph represents amplitude of an electromagnetic wave having a phase giving the maximum amplitude of the standing wave, and with this phase as a reference, a one-dot-chain line represents a phase-advanced state by 60°, a two-dot-chain line represents a phase-advanced state by 120°, and a broken line represents a phase-advanced state by 180°.

In order to simply describe the action of this exemplary embodiment, in FIGS. 6 and 7, a graph is drawn as an ideal perfect reflection terminal. It is well known that it is not possible to realize an ideal reflection terminal with no parasitic circuit element component, such as parasitic capacitance, parasitic inductance, or parasitic resistance, and the short-circuited terminal or the open terminal is a short-circuited terminal or an open terminal as a reflection terminal within a range capable of being actually created by a person skilled in the art. However, it is needless to say that, even in the actual reflection terminal, the action described in this exemplary embodiment is generally reproduced, and the effects of this exemplary embodiment are provided.

In FIG. 6, the traveling wave is reflected in the same phase at the free end of the first portion 407a and forms a reflected wave. By a combination of the traveling wave and the reflected wave, a standing wave is generated in the y direction inside the electromagnetic wave transmission sheet 403. The antinode of the standing wave appears at the free end, that is, at the position of the position coordinate 0.00, and then appears at every half wavelength of the position coordinates −0.50, −1.00, and −1.50. On the other hand, the node appears at the point of the position coordinate −0.25, and then appears at every half wavelength of the position coordinates −0.75 and −1.25.

In FIG. 7, the traveling wave is reflected in the same phase at the free end of the second portion 407b and forms a reflected wave. By a combination of the traveling wave and the reflected wave, a standing wave is generated in the y direction inside the electromagnetic wave transmission sheet 403. Since the second portion 407b is at the position of 0.25 in the y direction from the origin O, the antinode of the standing wave appears at the position of the position coordinate 0.25, and then appears at every half wavelength of the position coordinates −0.25, −0.75, and −1.25. On the other hand, the node appears at the point of the position coordinate 0.00, and then appears at every half wavelength of the position coordinates −0.50, −1.00, and −1.50.

Accordingly, in the electromagnetic wave transmission sheet 403 in which the first portion 407a and the second portion 407b are made free ends, when the position coordinates on the electromagnetic wave transmission sheet 403 measured in the y direction from the origin O are the same, when one portion is an antinode, the other portion becomes a node, and when one portion is a node, the other portion becomes an antinode. In this way, compared to a case where the first short end side 407 is made one type of reflection terminal, in this exemplary embodiment, since an antinode and a node complementarily appear in the first portion 407a and the second portion 407b, it is possible to provide an electromagnetic wave transmission device in which non-uniformity of electromagnetic wave strength caused by the standing wave is mitigated. Furthermore, since there is no electromagnetic wave absorbing medium in the four end sides of the electromagnetic wave transmission sheet 403, it is possible to provide an electromagnetic wave transmission device in which absorption or discarding of electromagnetic wave energy is suppressed in the traveling direction of the electromagnetic wave, as well as the direction perpendicular to the traveling direction of the electromagnetic wave.

Figure 8:
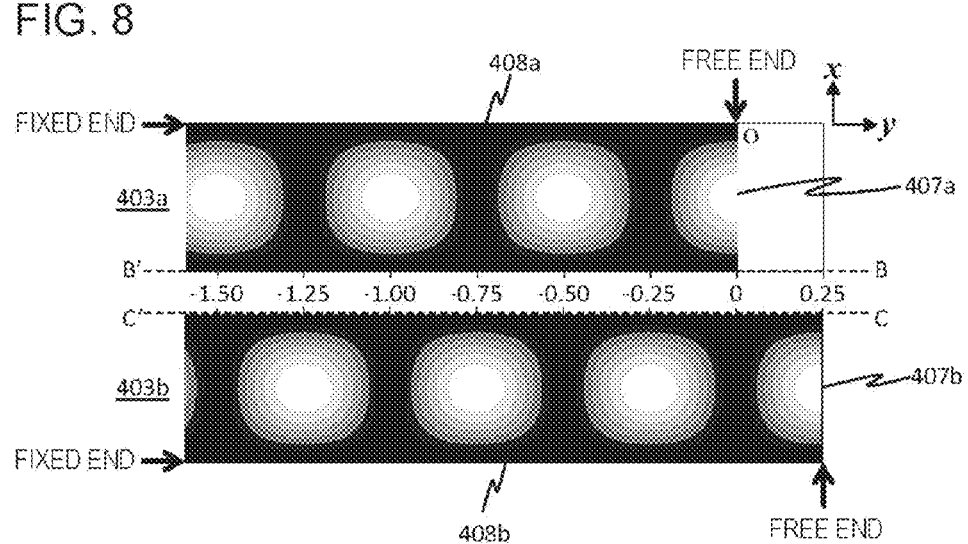
FIG. 8 is a grayscale view showing the state of a standing wave in an electromagnetic wave transmission sheet near a first short end side according to the third exemplary embodiment of the invention when a first short end side is a free end.

For description in more detail, a grayscale view of the states of standing waves in the first sheet 403a adjacent to the first portion 407a and the second sheet 403b adjacent to the second portion 407b is shown in FIG. 8. As a result of confirming experimentally, since it is understood that the mutual influence of the standing wave generated in the first sheet 403a and the standing wave generated in the second sheet 403b is sufficiently small, in FIG. 8, the influence is neglected. The horizontal axis described between the upper and lower grayscale views represents the position on the sheet measured in the y direction from the origin O of FIG. 5 in units of the wavelength of the electromagnetic wave traveling through the electromagnetic wave transmission sheet 403 in the y direction. The vertical axis represents the x axis of the first sheet 403a and the second sheet 403b. In this drawing, as an example, a case where the size in the x-axis direction of the first sheet 403a and the second sheet 403b is half wavelength is plotted. The grayscale in the drawing represents the maximum amplitude of the absolute value of the voltage, and represents that the maximum amplitude of the absolute value of the voltage increases from a black portion toward a white portion.

As described above, the first portion 407a and the second portion 407b are made open terminals, and in FIG. 8, this corresponds to a case where both the long end sides 408a and 408b of the electromagnetic wave transmission sheet 403 are short-circuited. As a result, in the first sheet 403a, the antinode displayed to be white appears at the position coordinate 0.00 (first portion 407a), and then appears at every half wavelength of the position coordinates −0.50, −1.00, and −1.50. The node displayed to be black appears at the point of the position coordinate −0.25, and then appears at every half wavelength of the position coordinates −0.75 and −1.25. On the other hand, in the second sheet 403b, the antinode displayed to be white appears at the position coordinate 0.25 (second portion 407b), and then appears at every half wavelength of the position coordinates −0.25, −0.75, and −1.25. The node displayed to be black appears at the point of the position coordinate 0.00, and then appears at every half wavelength of the position coordinates −0.50, −1.00, and −1.50.

Note that, in FIG. 8, as an example, although a case where the size in the x-axis direction of the first sheet 403a and the second sheet 403b is half wavelength is plotted, this exemplary embodiment is not limited to this condition, and it is needless to say that this exemplary embodiment may be applied to a case where there is the mutual influence of the standing wave generated in the first sheet 403a and the standing wave generated in the second sheet 403b.

Figure 9:
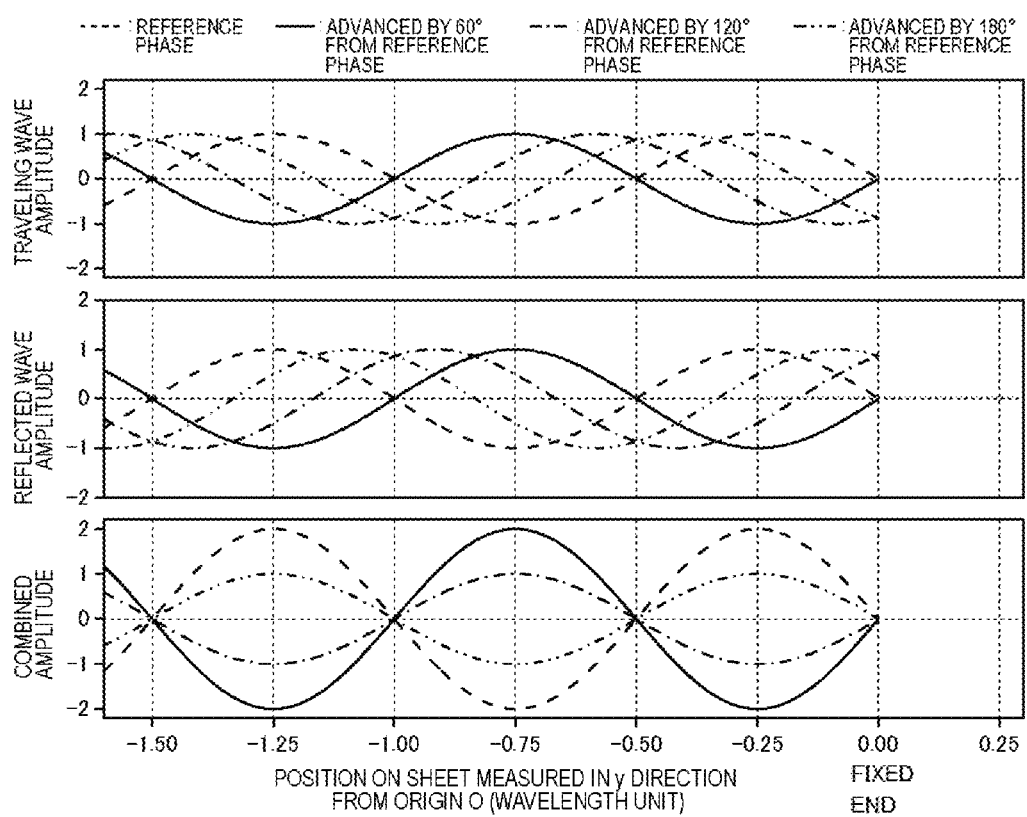
FIG. 9 is a graph schematically showing the states of a traveling wave, a reflected wave, and a standing wave formed by a combination thereof in an electromagnetic wave transmission sheet according to the third exemplary embodiment of the invention when a first short end side is a fixed end.
Figure 10:
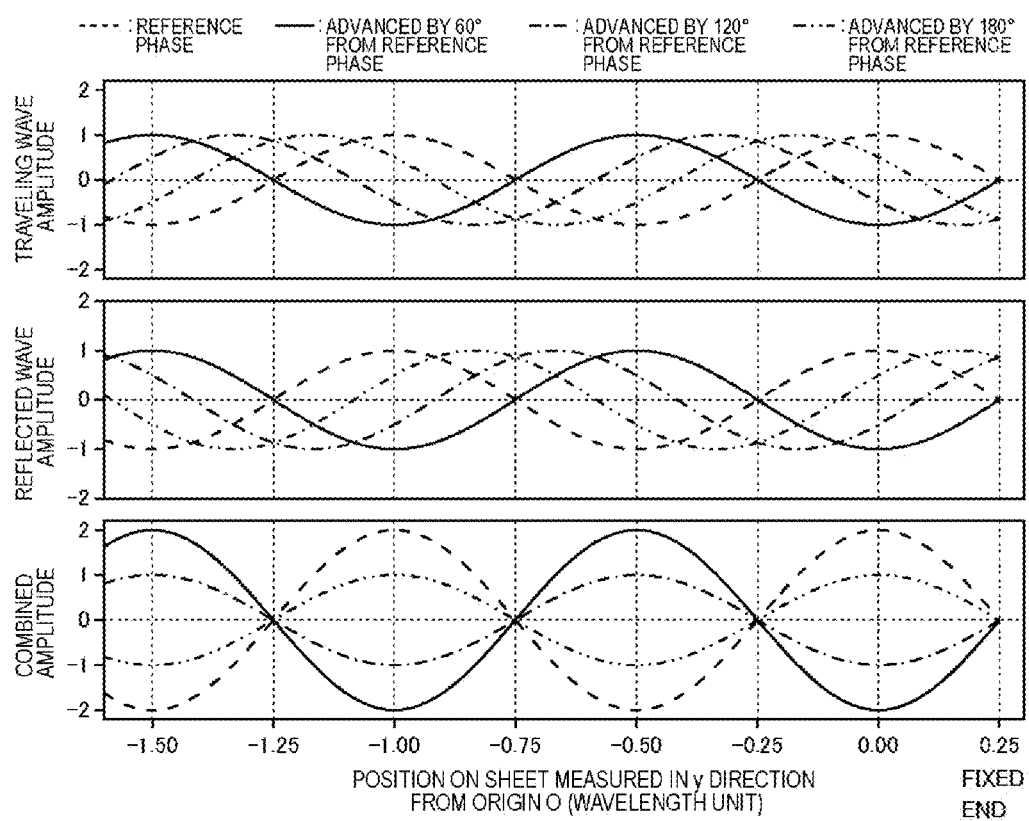
FIG. 10 is a graph schematically showing the states of a traveling wave, a reflected wave, and a standing wave formed by a combination thereof in an electromagnetic wave transmission sheet according to the third exemplary embodiment of the invention when a first short end side is a fixed end.

Next, fixed end reflection will be described. A graph illustrating amplitude of fixed end reflection in the first portion 407a is shown in FIG. 9, and a graph illustrating amplitude of fixed end reflection in the second portion 407b is shown in FIG. 10. FIGS. 9 and 10 have three graphs, and in FIGS. 9 and 10, amplitude of a traveling wave, amplitude of a reflected wave, and amplitude of a combined wave thereof are plotted from the top. The horizontal axis represents the position on the electromagnetic wave transmission sheet 403 measured in the y direction from the origin O of FIG. 5 in units of the wavelength of the electromagnetic wave traveling through the electromagnetic wave transmission sheet 403 in the y direction. A solid-line graph represents amplitude of an electromagnetic wave having a phase giving the maximum amplitude of the standing wave, and with this phase as a reference, a one-dot-chain line represents a phase-advanced state by 60°, a two-dot-chain line represents a phase-advanced state by 120°, and a broken line represents a phase-advanced state by 180°. In order to simply describe the action of this exemplary embodiment, in FIGS. 9 and 10, a graph is drawn as an ideal perfect reflection terminal. It is well known that it is not possible to realize an ideal reflection terminal with no parasitic circuit element component, such as parasitic capacitance, parasitic inductance, or parasitic resistance, and the short-circuited terminal or the open terminal is a short-circuited terminal or an open terminal as a reflection terminal within a range capable of being actually created by a person skilled in the art. However, it is needless to say that, even in the actual reflection terminal, the action described in this exemplary embodiment is generally reproduced, and the same effects are provided.

In FIG. 9, the traveling wave is reflected with phase rotation of 180 degrees at the fixed end of the first portion 407a and forms a reflected wave. By a combination of the traveling wave and the reflected wave, a standing wave is generated in the y direction inside the first sheet 403a. The node of the standing wave appears at the fixed end, that is, at the position of the position coordinate 0.00, and then appears at every half wavelength of the position coordinates −0.50, −1.00, and −1.50. On the other hand, the antinode appears at the point of the position coordinate −0.25, and then appears at every half wavelength of the position coordinates −0.75 and −1.25.

In FIG. 10, the traveling wave is reflected with phase rotation of 180 degrees at the fixed end of the second portion 407b and forms a reflected wave. By a combination of the traveling wave and the reflected wave, a standing wave is generated in the y direction inside the second sheet 403b. Since the terminal of the second sheet 403b is at the position of 0.25 in the y direction from the origin O, the node of the standing wave appears at the position of the position coordinate 0.25, and then appears at every half wavelength of the position coordinates −0.25, −0.75, and −1.25. On the other hand, the antinode appears at the point of the position coordinate 0.00, and then appears at every half wavelength of the position coordinates −0.50, −1.00, and −1.50.

Accordingly, in the first sheet 403a and the second sheet 403b which respectively have the first portion 407a and the second portion 407b as right ends, if the position coordinates on the sheets measured in the y direction from the origin O are the same, when one position coordinate is an antinode, the other position coordinate becomes a node, and when one position coordinate is a node, the other position coordinate becomes an antinode. In this way, compared to a case where the first short end side 407 is made one type of reflection terminal, in this exemplary embodiment, since an antinode and a node complementarily appear in the first sheet 403a and the second sheet 403b, it is possible to provide an electromagnetic wave transmission device in which non-uniformity of electromagnetic wave strength caused by the standing wave is mitigated.

As described above, the couplers which are mounted in the power reception devices disposed along the long end sides 408a and 408b of the electromagnetic wave transmission sheet 403 are disposed over the first sheet 403a, the second sheet 403b, and the third sheet 403c, and can receive power from the respective sheets. Accordingly, for example, even if a portion of the couplers hangs over the portion where one of the first sheet 403a and the second sheet 403b is a node, power is received from the antinodes of the other sheet complementarily arranged at the positions on the line segments substantially perpendicular to the long end sides 408a and 408b of the electromagnetic wave transmission sheet 403, thereby receiving power from the power transmission device.

Furthermore, since there is no electromagnetic wave absorbing medium in the four end sides of the electromagnetic wave transmission sheet 403, it is possible to provide an electromagnetic wave transmission device in which absorption or discarding of electromagnetic wave energy is suppressed in the traveling direction of the electromagnetic wave, as well as the direction perpendicular to the traveling direction of the electromagnetic wave.

Since the third portion 407c is not perpendicular to the long end sides 408a and 408b, the above-described clear standing wave is not obtained, and the phase of the reflected wave is further dispersed, it is advantageous to further mitigate non-uniformity of electromagnetic wave strength. As shown in the drawing, although the third portion 407c has a curved shape, instead of a linear shape, in this way, the amount of dispersion of the phase of the reflected wave is weighted, thereby further mitigating non-uniformity of electromagnetic wave strength. For example, as described above, when a configuration in which an antinode and a node complementarily appear in the first sheet 403a and the second sheet 403b is made, and when power is received from a leak electric field or magnetic field by one coupler, although it depends on the phases of the standing waves generated in the first sheet 403a and the second sheet 403b, as an example, a portion where electromagnetic wave strength is small is likely to be generated at −3/8 wavelength, −7/8 wavelength, and −11/8 wavelength with 1/8 wavelength of the position coordinates −0.375, −0.875, and −1.375 as a base. Accordingly, in the third portion 407c, it is desirable that a configuration in which the length in the x direction of the third portion 407c is particularly extended at the position coordinate of half the interval λ/4 in the y direction between the first portion 407a and the second portion 407b, that is, λ/8. In this case, the above-described portion where electromagnetic wave strength is small can be complemented for by the antinode of the standing wave of a portion of the third portion 407c where the length in the x direction is extended. Therefore, it is possible to further mitigate non-uniformity of electromagnetic wave strength caused by the standing wave.

As described above, the input units 404 are provided separately for the first sheet 403a, the second sheet 403b, and the third sheet 403c, and in general, the standing waves generated in the first sheet 403a, the second sheet 403b, and the third sheet 403c have separate phases among when the input of the AC power to the separate input units 404 is performed using three AC power sources, when the input of the AC power is performed by branching off the output of one AC power source, when the input of the AC power is performed by doubly branching off the output of one AC power source between two AC power sources and preparing three outputs in total, and the like. For example, the time at which the reference phase indicated by a solid line in FIGS. 6 and 7 is realized differs between the first sheet 403a and the second sheet 403b. However, the positions of the standing waves generated inside the first sheet 403a and the second sheet 403b, particularly, the positions of an antinode and a node do not depend on the phases. Accordingly, the effects of this exemplary embodiment are obtained regardless of the number of input units or the number of power sources.

The reflected power which is reflected by the first short end side 407 and returns to the input unit 404 may return to the AC power source. Furthermore, the reflected power may be separated from the traveling wave power and recovered using a device, such as a circulator. With this configuration, it is possible to increase power utilization efficiency.

Figure 11:
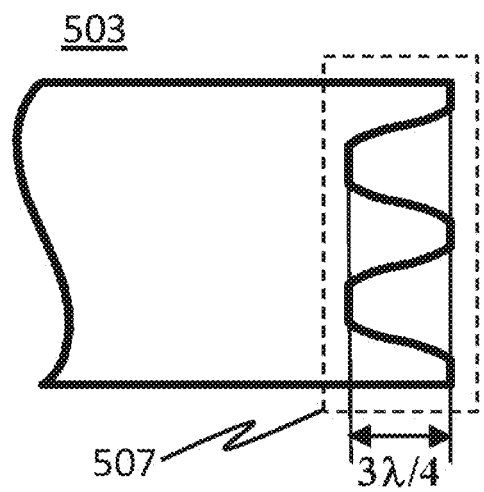
FIG. 11 is a diagram schematically showing a top view of another example of a first short end side of an electromagnetic wave transmission sheet in the configuration of the electromagnetic wave transmission device according to the third exemplary embodiment of the invention.

In this exemplary embodiment, although the first short end side 407 is divided into the three portions of the first portion 407a, the second portion 407b, and the third portion 407c, the configuration is not limited thereto. As another example, FIG. 11 shows a partial aspect corresponding to a first short end side among four end sides defining a substantially rectangular shape of an electromagnetic wave transmission sheet 503. In this case, the length of the first short end side 507 in a direction (y direction: in the drawing, a left-right direction) parallel to the long end sides is substantially equal to 3/4 of the wavelength λ of an electromagnetic wave traveling through the electromagnetic wave transmission sheet 503 in parallel to the long end side, and a rugged shape becomes complicated. In this way, a complicated shape is obtained while keeping the condition of the interval in the y direction, whereby it is possible to provide an electromagnetic wave transmission device capable of further suppressing standing waves and mitigating non-uniformity of electromagnetic wave strength.

Similarly, in regard to the number of power sources or the number of input units, as described above, various configurations in which the effects of this exemplary embodiment are similarly obtained are considered, and as in FIG. 11, when the number of divisions of the first short end side 507 is changed, the number of input units or the number of AC power sources may be accordingly changed in various ways.

Figure 12:
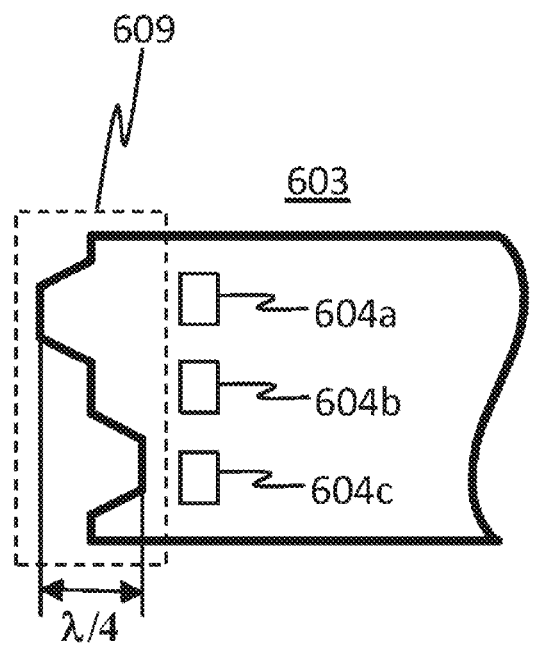
FIG. 12 is a diagram schematically showing a top view of another example of a second short end side of an electromagnetic wave transmission sheet in the configuration of the electromagnetic wave transmission device according to the third exemplary embodiment of the invention.

Similarly to the first short end side, the second short end side (the short end side near which the input unit is provided) may have a plurality of portions. For example, as shown in FIG. 12, the length of a second short end side 609 in a direction (y direction: in the drawing, a left-right direction) parallel to the long end sides is substantially equal to 1/4 of the wavelength λ of an electromagnetic wave traveling through an electromagnetic wave transmission sheet 603 in parallel to the long end sides, and a rugged shape becomes complicated. In this case, it is desirable that the configurations of the reflection terminals of the first short end side and the second short end side have low symmetry. It is more desirable that the configurations of the reflection terminals of the first short end side and the second short end side have no line symmetry or rotation symmetry. With this, it is possible to further suppress the appearance of an unintended node, and to provide an electromagnetic wave transmission device in which non-uniformity of electromagnetic wave strength caused by the standing wave is further mitigated. In FIG. 12, three input units 604a, 604b, and 604c are provided.

In this exemplary embodiment, the reflection terminal is not limited to a short-circuited terminal and an open terminal. As in the structure of the electromagnetic wave transmission sheet described in Patent Document 2 (Japanese Unexamined Patent Publication No. 2010-114696), an inductor or a capacitor is inserted and connected between a meshlike conductor portion directly below an insulation film on the surface of the electromagnetic wave transmission sheet 403 and a sheetlike conductor portion disposed as a ground surface below the electromagnetic wave transmission sheet 403, whereby a reflection terminal in which the phase difference between the reflected wave and the traveling wave is not 0 degrees or 180 degrees compared to a short-circuited terminal or an open terminal can be realized. In Patent Document 2 (Japanese Unexamined Patent Publication No. 2010-114696), the insulating film is described as a protective layer made of resin or the like. With the loading of the inductor or the capacitor on the first portion 407a, the second portion 407b, and the third portion 407c, a configuration in which the same type of reflection terminals, for example, reflection terminals different from a short-circuited terminal or an open terminal are made at the three right ends, and an antinode and a node are complementarily arranged can be realized. With the loading of the inductor or the capacitor on the first portion 407a, the second portion 407b, and the third portion 407c, the position of the standing wave can be freely operated. The inductor or the capacitor may be, for example, a variable element, such as a variable coil, a variable capacitor, or a trimmer capacitor. In this case, the inductance or capacitance is adjusted as necessary even after manufacturing, thereby adjusting the position of the standing wave.

The width W (the width in a direction perpendicular to the long end sides) of the short end sides of the electromagnetic wave transmission sheet 403 is not particularly limited, and as in an example shown in FIG. 8, when the reflection terminals of the long end sides 408a and 408b are of the same type, the width W of the short end sides of the electromagnetic wave transmission sheet 403 may be substantially equal to a natural number multiple of half of the wavelength of the electromagnetic wave propagating through the electromagnetic wave transmission sheet 403 in the x direction. Accordingly, the electromagnetic wave is reflected on the long end sides 408a and 408b of the electromagnetic wave transmission sheet 403 to become a resonance state in the horizontal width direction, and the distribution in the horizontal width direction of the electromagnetic field of the electromagnetic wave transmission sheet 403 is stabilized. Accordingly, the electric field or magnetic field distribution leaking from the electromagnetic wave transmission sheet 403 is stabilized.

The reason that the term "substantially equal" is used is that the frequency spectrum of an electromagnetic wave propagating through the electromagnetic wave transmission sheet 403 may spread, that is, may have a bandwidth, and in this case, an electromagnetic wave propagating through the electromagnetic wave transmission sheet 403 is not expressed as a single wavelength. In this case, the wavelength corresponding roughly to the center frequency of the frequency band may be used as a representative to set the wavelength of the electromagnetic wave propagating through the electromagnetic wave transmission sheet 403. Alternatively, in case of a modulated wave or the like, the wavelength corresponding to the frequency of a carrier wave may be used. In order that the electromagnetic wave is reflected on the long end sides 408a and 408b of the electromagnetic wave transmission sheet 403 to become the resonance state in the horizontal width direction, as described above, the termination method of the two long end sides 408a and 408b of the electromagnetic wave transmission sheet 403 may be set so that different reflection terminals such that one long end side is short-circuited and the other long end side is open, and the width of the short sides may be substantially equal to an odd number multiple of ¼ wavelength of the electromagnetic wave. In this case, the same effects as described above are obtained.

All the four end sides defining the substantially rectangular shape of the electromagnetic wave transmission sheet 403 of this exemplary embodiment may be made short-circuited terminals. With this configuration, the influence of an electromagnetic wave leaking from the end side portions or an electromagnetic wave entering the sheet from the periphery of the electromagnetic wave transmission sheet 403 is eliminated, thereby securing a stable operation.

All of the four end sides defining the substantially rectangular shape of the electromagnetic wave transmission sheet 403 may be open terminals. In this configuration, although there is an influence of an electromagnetic wave leaking from the end sides or an electromagnetic wave entering the sheet from the periphery of the electromagnetic wave transmission sheet 403, the end portions of the electromagnetic wave transmission sheet 403 may be in the cut state as it is, the termination processing is not required, and manufacturing can be achieved at low cost. The short-circuited terminal or the open terminal used herein means a short-circuited terminal or an open terminal as a reflection terminal within a range capable of being actually created by a person skilled in the art, instead of an ideal perfect reflection terminal with no parasitic circuit element component, such as parasitic capacitance, parasitic inductance, or parasitic resistance.

Note that, since the electric field coupler and the magnetic field coupler are described in detail in the related art and the like, in this exemplary embodiment, the implementation method of the electric field coupler and the magnetic field coupler will not be particularly described in detail. Though not shown, an impedance matching circuit, an isolator, a protection circuit, a control circuit, and the like are appropriately inserted as necessary.

Although the exemplary embodiment of the invention has been described, the invention is not limited to the foregoing exemplary embodiment and the example. Various changes which can be understood by those skilled in the art may be made to the configuration and details of the invention within the scope of the invention.

This application claims priority based on Japanese Patent Application No. 2012-22506, filed Feb. 3, 2012, the entire disclosure of which is incorporated herein by reference.

The invention claimed is:

1. An electromagnetic wave transmission sheet which is connected to an AC power source and transmits an electromagnetic wave,
wherein an edge portion which defines a planar shape has two long end sides which have parallel portions extending in parallel to each other, and two short end sides which have parallel portions extending in parallel to each other and are shorter than the long end sides, the two long end sides and the two short end sides are reflection terminals,
the parallel portion of at least a first short end side out of the two short end sides includes a first portion and a second portion,
an electromagnetic wave which propagates in a direction substantially parallel to the parallel portions of the long end sides includes:
a first standing wave formed by a traveling wave directed toward the first portion of the first short end side and a reflected wave reflected by the first portion and directed toward the second short end side; and
a second standing wave formed by a traveling wave directed toward the second portion of the first short end side and a reflected wave reflected by the second portion and directed toward the second short end side, and positions of antinodes of the first standing wave and the second standing wave in a direction substantially parallel to the parallel portions of the long end sides are deviated from each other by ¼ of the wavelength of an electromagnetic wave propagating through the electromagnetic wave transmission sheet, wherein the first portion of the electromagnetic wave transmission sheet is a short circuited terminal, and the second portion is an open terminal, and when a region on the electromagnetic wave transmission sheet where the first portion of the first short end side extends in the direction parallel to the parallel portions of the long end sides is a first sheet, and a region where the second portion of the first short end side extends in the direction parallel to the parallel portions of the long end sides is a second sheet, a coupler is disposed over the first sheet and the second sheet.

2. The electromagnetic wave transmission sheet according to claim 1, wherein the positions of the first portion and the second portion in the direction parallel to the parallel portions of the long end sides are different from each other.

3. The electromagnetic wave transmission sheet according to claim 2, wherein the distance between the first portion and the second portion in the direction parallel to the parallel portions of the long end sides is substantially equal to a value obtained by adding ¼ of the wavelength to an M (an integer equal to or greater than 0) multiple of half the wavelength of the electromagnetic wave propagating through the electromagnetic wave transmission sheet.

4. The electromagnetic wave transmission sheet according to claim 3, wherein M is 0.

5. An electromagnetic wave transmission device comprising: the electromagnetic wave transmission sheet according to claim 1;

an input unit which is provided near the second short end side of the electromagnetic wave transmission sheet;

a power transmission device which has an AC power source connected to the input unit;

and a power reception device which is disposed on the electromagnetic wave transmission sheet and has the coupler configured to be coupled to at least one of an electric field and a magnetic field among electromagnetic waves leaking from the surface of the electromagnetic wave transmission sheet.

* * * * *